(12) United States Patent
Imanaka et al.

(10) Patent No.: US 11,772,005 B2
(45) Date of Patent: Oct. 3, 2023

(54) APPARATUS FOR AND METHOD OF PRODUCING ULTRAFINE BUBBLE-CONTAINING LIQUID, AND ULTRAFINE BUBBLE-CONTAINING LIQUID

(71) Applicant: CANON KABUSHIKI KAISHA, Tokyo (JP)

(72) Inventors: Yoshiyuki Imanaka, Kanagawa (JP); Masahiko Kubota, Tokyo (JP); Akitoshi Yamada, Kanagawa (JP); Akira Yamamoto, Kanagawa (JP); Yumi Yanai, Kanagawa (JP); Teruo Ozaki, Kanagawa (JP); Toshio Kashino, Kanagawa (JP); Hiroyuki Ishinaga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 17/178,487

(22) Filed: Feb. 18, 2021

(65) Prior Publication Data

US 2021/0268397 A1    Sep. 2, 2021

(30) Foreign Application Priority Data

Feb. 28, 2020 (JP) .................... 2020-032756
Feb. 8, 2021 (JP) .................... 2021-018346

(51) Int. Cl.
| | | |
|---|---|---|
| *B01B 1/00* | (2006.01) | |
| *F22B 1/28* | (2006.01) | |
| *F22B 3/02* | (2006.01) | |
| *B01D 19/00* | (2006.01) | |
| *B01F 23/233* | (2022.01) | |
| *B01F 23/70* | (2022.01) | |
| *B01F 23/80* | (2022.01) | |

(Continued)

(52) U.S. Cl.
CPC ............. *B01B 1/00* (2013.01); *F22B 1/284* (2013.01); *F22B 3/02* (2013.01); *B01D 19/0031* (2013.01); *B01F 23/233* (2022.01); *B01F 23/23363* (2022.01); *B01F 23/237613* (2022.01); *B01F 23/703* (2022.01); *B01F 23/811* (2022.01); *B01F 2101/48* (2022.01)

(58) Field of Classification Search
CPC .............. F22B 1/284; F22B 3/02; B01B 1/00
See application file for complete search history.

(56) References Cited

U.S. PATENT DOCUMENTS

| | | | | |
|---|---|---|---|---|
| 5,334,920 | A * | 8/1994 | Ito ........................ | H02P 8/38 318/696 |
| 2019/0329199 | A1* | 10/2019 | Sugano ................ | B01F 23/232 |
| 2020/0197963 | A1 | 6/2020 | Takahashi et al. | |

(Continued)

FOREIGN PATENT DOCUMENTS

| | | |
|---|---|---|
| JP | 2019-42664 A | 3/2019 |
| WO | 2018/097019 A1 | 5/2018 |

*Primary Examiner* — Erin McGrath
(74) *Attorney, Agent, or Firm* — VENABLE LLP

(57) ABSTRACT

Provided is a method of producing an ultrafine bubble-containing liquid containing ultrafine bubbles generated by causing film boiling in a liquid with a heat generation member, including: detaching a solid present at a liquid contact surface of the heat generation member in a form of a microscopic substance by using the film boiling; and generating ultrafine bubbles with the detached microscopic substance as a core.

12 Claims, 24 Drawing Sheets

(51) Int. Cl.
*B01F 23/237* (2022.01)
*B01F 101/48* (2022.01)

(56) References Cited

U.S. PATENT DOCUMENTS

| | | |
|---|---|---|
| 2020/0254468 A1 | 8/2020 | Kubota et al. |
| 2020/0276514 A1 | 9/2020 | Ishinaga et al. |
| 2020/0276515 A1 | 9/2020 | Kubota et al. |
| 2020/0276516 A1 | 9/2020 | Imanaka et al. |
| 2020/0276803 A1 | 9/2020 | Arimizu et al. |
| 2020/0276804 A1 | 9/2020 | Kubota et al. |

* cited by examiner

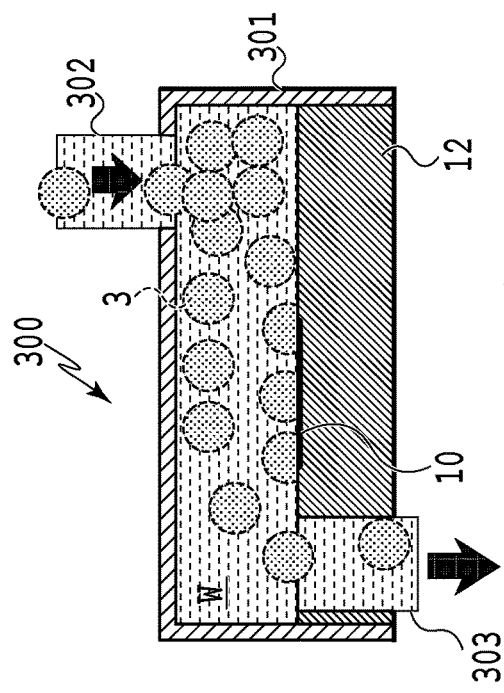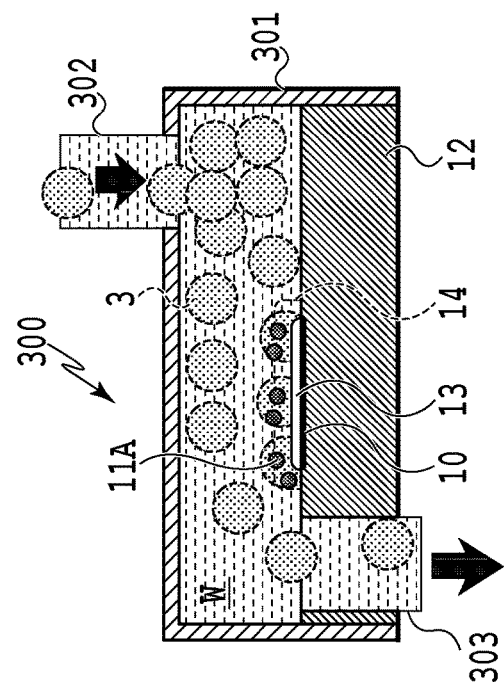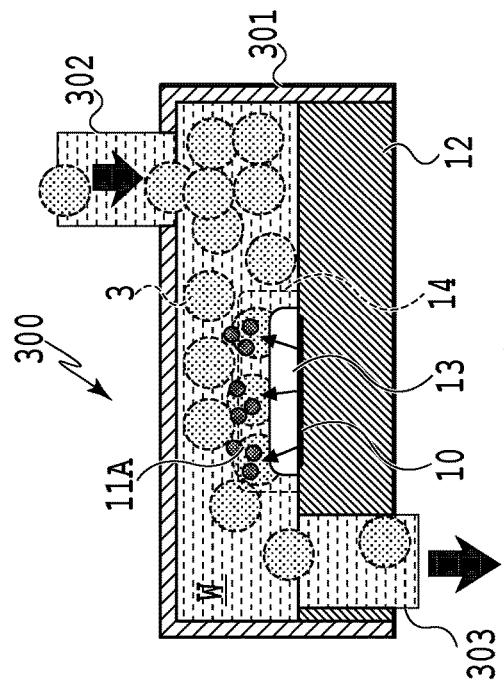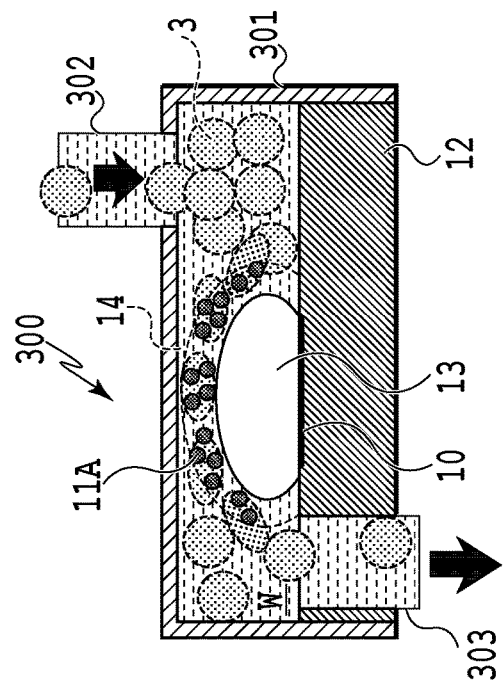

APPARATUS FOR AND METHOD OF PRODUCING ULTRAFINE BUBBLE-CONTAINING LIQUID, AND ULTRAFINE BUBBLE-CONTAINING LIQUID

BACKGROUND OF THE INVENTION

Field of the Invention

The present invention relates to an apparatus for and a method of producing an ultrafine bubble-containing liquid containing ultrafine bubbles with a diameter of less than 1.0 and an ultrafine bubble-containing liquid.

Description of the Related Art

Recently, there have been developed techniques for applying the features of fine bubbles such as microbubbles in micrometer-size in diameter and nanobubbles in nanometer-size in diameter. Among them, the utility of ultrafine bubbles (hereinafter also referred to as "UFBs") smaller than 1.0 μm in diameter have been confirmed in various fields.

Japanese Patent Laid-Open No. 2019-42664 (hereinafter referred to as Reference 1) discloses an apparatus that generates UFBs by film boiling. International Laid-Open No 2018/097019 (hereinafter referred to as Reference 2) discloses a fine bubble generation promoter for nano-order fine bubbles.

The technique in Reference 1 can generate a significantly high concentration of UFBs as compared to methods such as a pressurized dissolution method. The fine bubble generation promoter in Reference 2 is described as being capable of keeping a high concentration of fine bubbles for a long period. There is a demand for a liquid containing a higher concentration of UFBs than UFBs that can be obtained by these techniques.

SUMMARY OF THE INVENTION

A method of producing an ultrafine bubble-containing liquid according to an aspect of the present invention is a method of producing an ultrafine bubble-containing liquid containing ultrafine bubbles generated by causing film boiling in a liquid with a heat generation member, comprising: detaching a solid present at a liquid contact surface of the heat generation member in a form of a microscopic substance by using the film boiling; and generating ultrafine bubbles with the detached microscopic substance as a core.

In addition, an ultrafine bubble-containing liquid according to an aspect of the present invention is an ultrafine bubble-containing liquid containing ultrafine bubbles generated by causing film boiling in a liquid with a heat generation member, comprising an ultrafine bubble generated by detaching a solid present at a liquid contact surface of the heat generation member in a form of a microscopic substance with the film boiling and using the detached microscopic substance as a core.

In addition, an ultrafine bubble-containing liquid producing apparatus according to an aspect of the present invention is an ultrafine bubble-containing liquid producing apparatus for producing an ultrafine bubble-containing liquid containing ultrafine bubbles generated by causing film boiling in a liquid with a heat generation member, the producing apparatus comprising: a heat generation member; a solid present at a liquid contact surface of the heat generation member; and a generating unit configured to detach the solid in a form of a microscopic substance with the film boiling and generates ultrafine bubbles with the detached microscopic substance as a core.

Further features of the present invention will become apparent from the following description of exemplary embodiments with reference to the attached drawings.

BRIEF DESCRIPTION OF THE DRAWINGS

FIGS. 7A to 7D are diagrams illustrating the states of generation of UFBs caused by expansion of a film boiling bubble;

DESCRIPTION OF THE EMBODIMENTS

<<Outline of UFB Producing Method>>

An outline of a UFB generating method utilizing a film boiling phenomenon will be described below.

Figure 1:
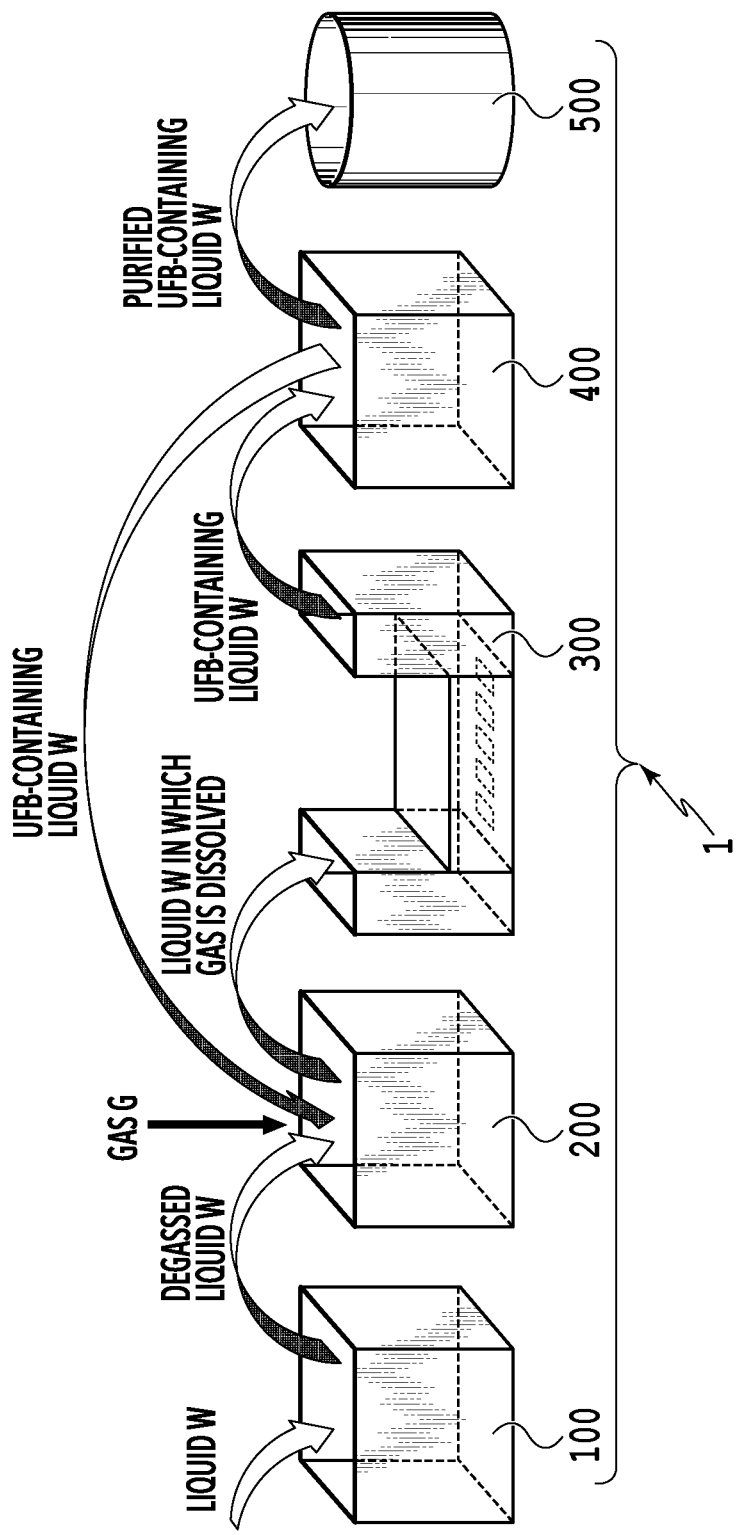
FIG. 1 is a diagram illustrating an example of a UFB generating apparatus.

FIG. 1 is a diagram illustrating an example of an ultrafine bubble generating apparatus (UFB generating apparatus). A UFB generating apparatus 1 includes a pre-processing unit 100, dissolving unit 200, a T-UFB generating unit 300, a post-processing unit 400, and a collecting unit 500. Each unit performs unique processing on a liquid W such as tap water supplied to the pre-processing unit 100 in the above order, and the thus-processed liquid W is collected as a T-UFB-containing liquid by the collecting unit 500. Functions and configurations of the units are described below. Although details are described later, UFBs generated by utilizing the film boiling caused by rapid heating are referred to as thermal-ultrafine bubbles (T-UFBs) in this specification.

Figure 2:
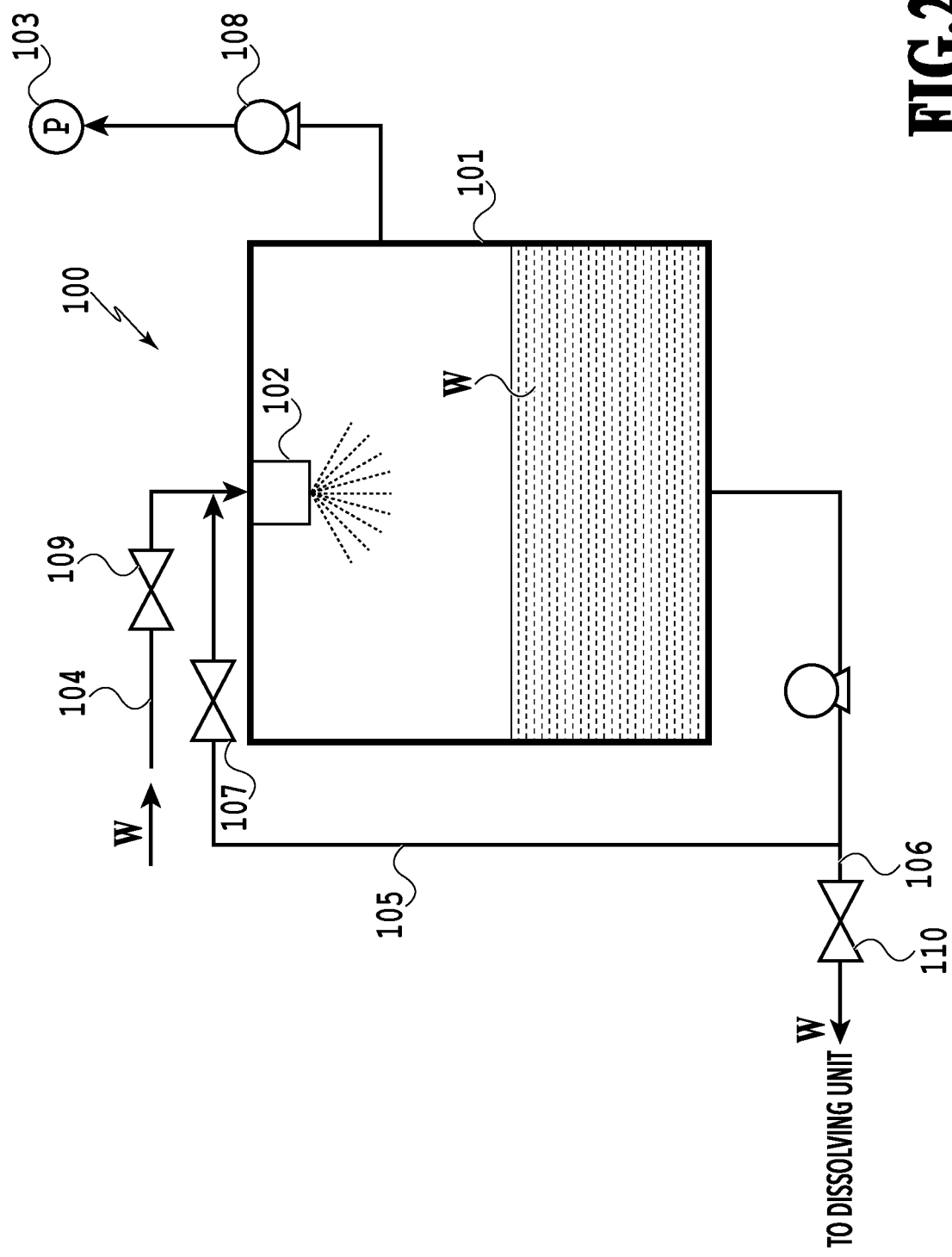
FIG. 2 is a schematic configuration diagram of a pre-processing unit.

FIG. 2 is a schematic configuration diagram of the pre-processing unit 100. The pre-processing unit 100 performs a degassing treatment on the supplied liquid W. The pre-processing unit 100 mainly includes a degassing container 101, a shower head 102, a depressurizing pump 103, a liquid introduction passage 104, a liquid circulation passage 105, and a liquid discharge passage 106. For example, the liquid W such as tap water is supplied to the degassing container 101 from the liquid introduction passage 104 through a valve 109. In this process, the shower head 102 provided in the degassing container 101 sprays a mist of the liquid W in the degassing container 101. The shower head 102 is for prompting the gasification of the liquid W; however, a centrifugal and the like may be used instead as the mechanism for producing the gasification prompt effect.

When a certain amount of the liquid W is reserved in the degassing container 101 and then the depressurizing pump 103 is activated with all the valves closed, already-gasified gas components are discharged, and gasification and discharge of gas components dissolved in the liquid W are also prompted. In this process, the internal pressure of the degassing container 101 may be depressurized to around several hundreds to thousands of Pa (1.0 Torr to 10.0 Torr) while checking a manometer 108. The gases to be removed by the pre-processing unit 100 includes nitrogen, oxygen, argon, carbon dioxide, and so on, for example.

The above-described degassing processing can be repeatedly performed on the same liquid W by utilizing the liquid circulation passage 105. Specifically, the shower head 102 is operated with the valve 109 of the liquid introduction passage 104 and a valve 110 of the liquid discharge passage 106 closed and a valve 107 of the liquid circulation passage 105 opened. This allows the liquid W reserved in the degassing container 101 and degassed once to be resprayed in the degassing container 101 from the shower head 102. In addition, with the depressurizing pump 103 operated, the gasification processing by the shower head 102 and the degassing processing by the depressurizing pump 103 are repeatedly performed on the same liquid W. Every time the above processing utilizing the liquid circulation passage 105 is performed repeatedly, it is possible to decrease the gas components contained in the liquid W in stages. Once the liquid W degassed to a desired purity is obtained, the liquid W is transferred to the dissolving unit 200 through the liquid discharge passage 106 with the valve 110 opened.

FIG. 2 illustrates the pre-processing 100 that depressurizes the gas part to gasify the solute; however, the method of degassing the solution is not limited thereto. For example, a heating and boiling method for boiling the liquid W to gasify the solute may be employed, or a film degassing method for increasing the interface between the liquid and the gas using hollow fibers. A SEPAREL series (produced by DIC corporation) is commercially supplied as the degassing module using the hollow fibers. The SEPAREL series uses poly(4-methylpentene-1) (PMP) for the raw material of the hollow fibers and is used for removing air bubbles from ink and the like mainly supplied for a piezo head. In addition, two or more of an evacuating method, the heating and boiling method, and the film degassing method may be used together.

Figure 3A:
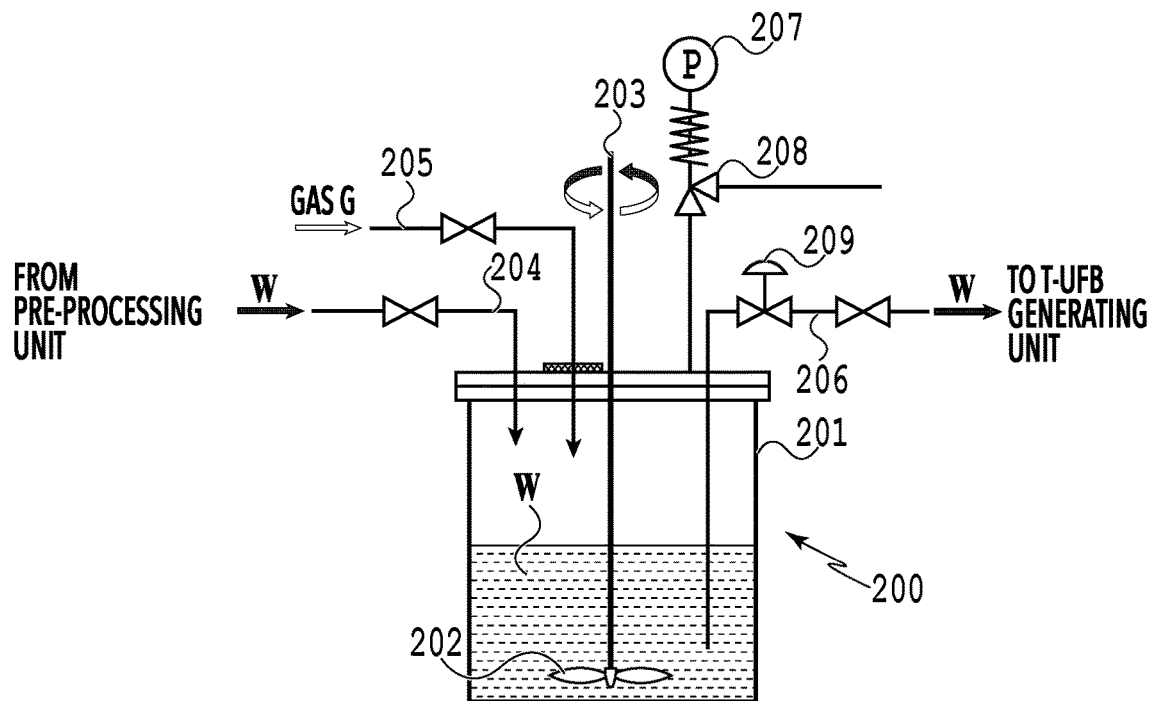
FIGS. 3A and 3B are a schematic configuration diagram of a dissolving unit and a diagram for describing the dissolving states in a liquid.
Figure 3B:
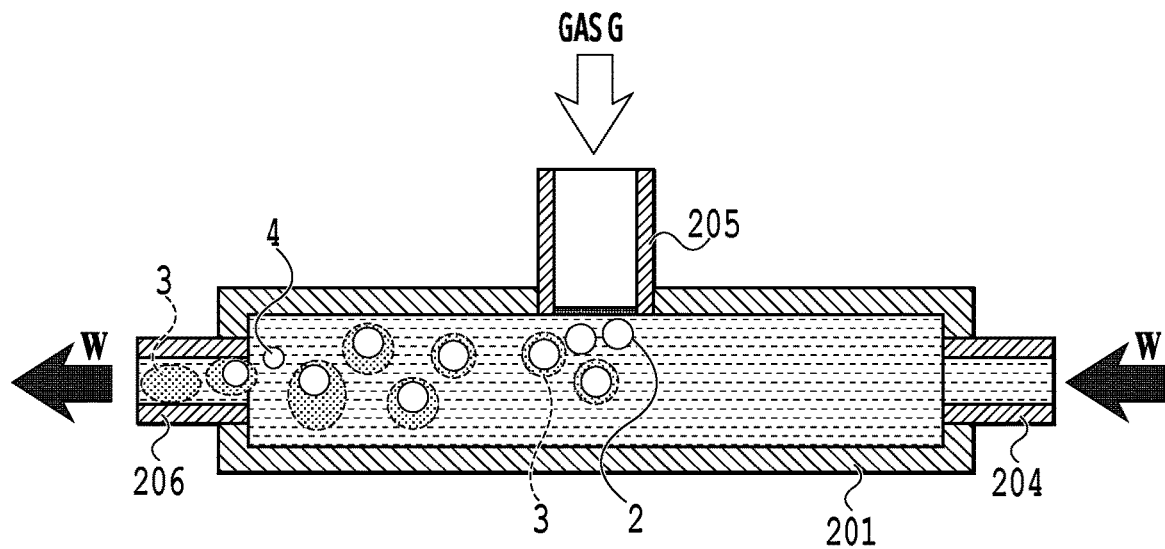

FIGS. 3A and 3B are a schematic configuration diagram of the dissolving unit 200 and a diagram for describing the dissolving states in the liquid. The dissolving unit 200 is a unit for dissolving a desired gas into the liquid W supplied from the pre-processing unit 100. The dissolving unit 200 mainly includes a dissolving container 201, a rotation shaft 203 provided with a rotation plate 202, a liquid introduction passage 204, a gas introduction passage 205, a liquid discharge passage 206, and a pressurizing pump 207.

The liquid W supplied from the pre-processing unit 100 is supplied and reserved into the dissolving container 201 through the liquid introduction passage 204. Meanwhile, a gas G is supplied to the dissolving container 201 through the gas introduction passage 205.

Once predetermined amounts of the liquid W and the gas G are reserved in the dissolving container 201, the pressurizing pump 207 is activated to increase the internal pressure of the dissolving container 201 to about 0.5 MPa. A safety valve 208 is arranged between the pressurizing pump 207 and the dissolving container 201. With the rotation plate 202 in the liquid rotated via the rotation shaft 203, the gas G supplied to the dissolving container 201 is transformed into air bubbles, and the contact area between the gas G and the liquid W is increased to prompt the dissolution into the liquid W. This operation is continued until the solubility of the gas G reaches almost the maximum saturation solubility. In this case, a unit for decreasing the temperature of the liquid may be provided to dissolve the gas as much as possible. When the gas is with low solubility, it is also possible to increase the internal pressure of the dissolving container 201 to 0.5 MPa or higher. In this case, the material and the like of the container need to be the optimum for safety sake.

Once the liquid W in which the components of the gas G are dissolved at a desired concentration is obtained, the liquid W is discharged through the liquid discharge passage 206 and supplied to the T-UFB generating unit 300. In this process, a back-pressure valve 209 adjusts the flow pressure of the liquid W to prevent excessive increase of the pressure during the supplying.

FIG. 3B is a diagram schematically illustrating the dissolving states of the gas G put in the dissolving container 201. An air bubble 2 containing the components of the gas G put in the liquid W is dissolved from a portion in contact with the liquid W. The air bubble 2 thus shrinks gradually, and a gas-dissolved liquid 3 then appears around the air bubble 2. Since the air bubble 2 is affected by the buoyancy, the air bubble 2 may be moved to a position away from the center of the gas-dissolved liquid 3 or be separated out from the gas-dissolved liquid 3 to become a residual air bubble 4. Specifically, in the liquid W to be supplied to the T-UFB generating unit 300 through the liquid discharge passage 206, there is a mix of the air bubbles 2 surrounded by the gas-dissolved liquids 3 and the air bubbles 2 and the gas-dissolved liquids 3 separated from each other.

The gas-dissolved liquid 3 in the drawings means "a region of the liquid W in which the dissolution concentration of the gas G mixed therein is relatively high." In the gas components actually dissolved in the liquid W, the concentration of the gas components in the gas-dissolved liquid 3 is the highest at a portion surrounding the air bubble 2. In a case where the gas-dissolved liquid 3 is separated from the air bubble 2 the concentration of the gas components of the gas-dissolved liquid 3 is the highest at the center of the region, and the concentration is continuously decreased as away from the center. That is, although the region of the gas-dissolved liquid 3 is surrounded by a broken line in FIG. 3 for the sake of explanation, such a clear boundary does not actually exist. In addition, in the present disclosure, a gas that cannot be dissolved completely may be accepted to exist in the form of an air bubble in the liquid.

Figure 4:
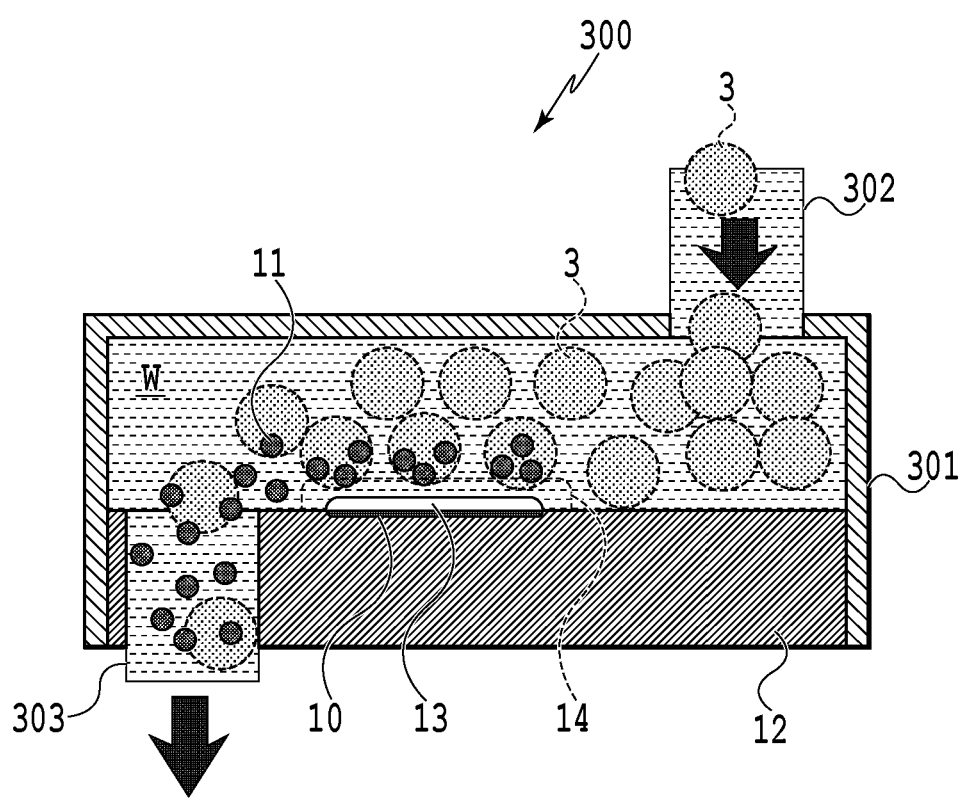
FIG. 4 is a schematic configuration diagram of a T-UFB generating unit.

FIG. 4 is a schematic configuration diagram of the T-UFB generating unit 300. The T-UFB generating unit 300 mainly includes a chamber 301, a liquid introduction passage 302, and a liquid discharge passage 303. The flow from the liquid introduction passage 302 to the liquid discharge passage 303 through the chamber 301 is formed by a not-illustrated flow pump. Various pumps including a diaphragm pump, a gear pump, and a screw pump may be employed as the flow pump. In in the liquid W introduced from the liquid introduction passage 302, the gas-dissolved liquid 3 of the gas G put by the dissolving unit 200 is mixed.

An element substrate 12 provided with a heating element 10 is arranged on a bottom section of the chamber 301. With a predetermined voltage pulse applied to the heating element 10, a bubble 13 generated by the film boiling (hereinafter, also referred to as a film boiling bubble 13) is generated in a region in contact with the heating element 10. Then, an ultrafine bubble (UFB) 11 containing the gas G is generated caused by expansion and shrinkage of the film boiling bubble 13. As a result, a UFB-containing liquid W containing many UFBs 11 is discharged from the liquid discharge passage 303.

Figure 5A:
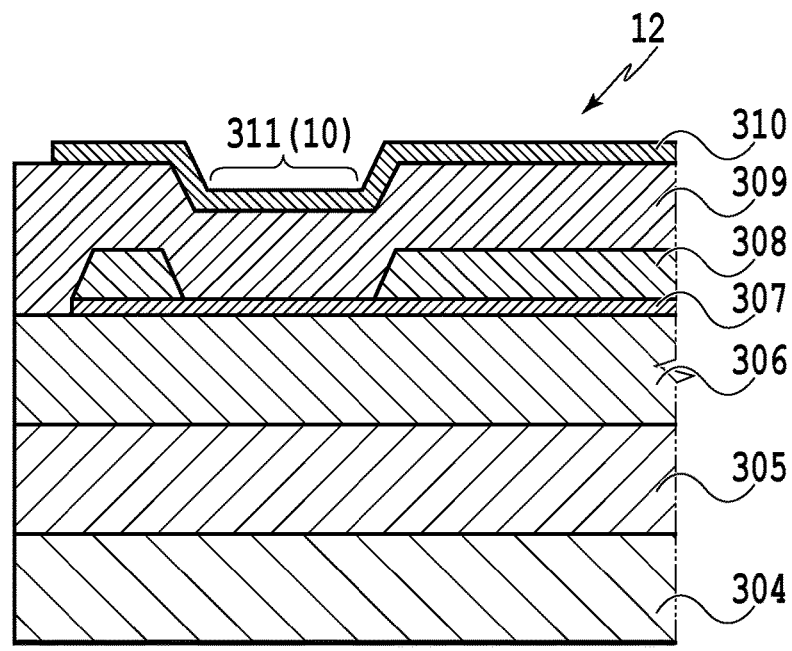
FIGS. 5A and 5B are diagrams for describing details of a heating element.
Figure 5B:
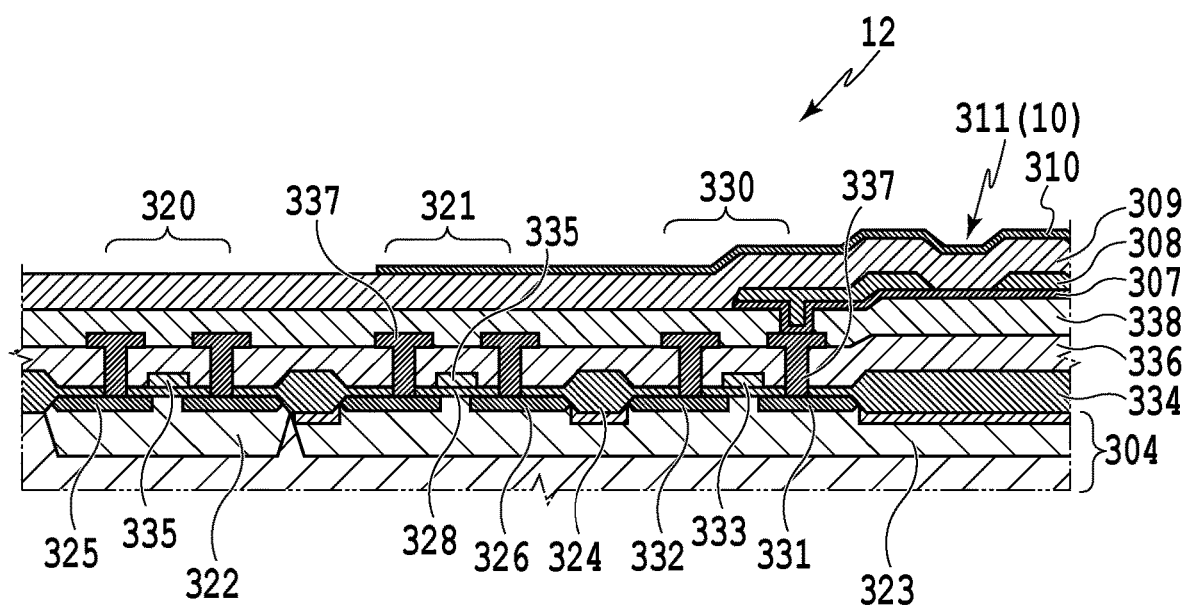

FIGS. 5A and 5B are diagrams for illustrating a detailed configuration of the heating element 10. FIG. 5A illustrates a closeup view of the heating element 10, and FIG. 5B illustrates a cross-sectional view of a wider region of the element substrate 12 including the heating element 10.

As illustrated in FIG. 5A, in the element substrate 12, a thermal oxide film 305 as a heat-accumulating layer and an interlaminar film 306 also served as a heat-accumulating layer are laminated on a surface of a silicon substrate 304. An $SiO_2$ film or an SiN film may be used as the interlaminar film 306. A resistive layer 307 is formed on a surface of the interlaminar film 306, and a wiring 308 is partially formed on a surface of the resistive layer 307. An Al-alloy wiring of Al, Al—Si, Al—Cu, or the like may be used as the wiring 308. A protective layer 309 made of an $SiO_2$ film or an $Si_3N_4$ film is formed on surfaces of the wiring 308, the resistive layer 307, and the interlaminar film 306.

A cavitation-resistant film 310 for protecting the protective layer 309 from chemical and physical impacts due to the heat evolved by the resistive layer 307 is formed on a portion and around the portion on the surface of the protective layer 309, the portion corresponding to a heat-acting portion 311 that eventually becomes the heating element 10. A region on the surface of the resistive layer 307 in which the wiring 308 is not formed is the heat-acting portion 311 in which the resistive layer 307 evolves heat. The heating portion of the resistive layer 307 on which the wiring 308 is not formed functions as the heating element (heater) 10. As described above, the layers in the element substrate 12 are sequentially formed on the surface of the silicon substrate 304 by a semiconductor production technique, and the heat-acting portion 311 is thus provided on the silicon substrate 304.

The configuration illustrated in the drawings is an example, and various other configurations are applicable. For example, a configuration in which the laminating order of the resistive layer 307 and the wiring 308 is opposite, and a configuration in which an electrode is connected to a lower surface of the resistive layer 307 (so-called a plug electrode configuration) are applicable. In other words, as described later, any configuration may be applied as long as the configuration allows the heat-acting portion 311 to heat the liquid for generating the film boiling in the liquid.

FIG. 5B is an example of a cross-sectional view of a region including a circuit connected to the wiring 308 in the element substrate 12. An N-type well region 322 and a P-type well region 323 are partially provided in a top layer of the silicon substrate 304, which is a P-type conductor. AP-MOS 320 is formed in the N-type well region 322 and an N-MOS 321 is formed in the P-type well region 323 by introduction and diffusion of impurities by the ion implantation and the like in the general MOS process.

The P-MOS 320 includes a source region 325 and a drain region 326 formed by partial introduction of N-type or P-type impurities in a top layer of the N-type well region 322, a gate wiring 335, and so on. The gate wiring 335 is deposited on a part of a top surface of the N-type well region 322 excluding the source region 325 and the drain region 326, with a gate insulation film 328 of several hundreds of Å in thickness interposed between the gate wiring 335 and the top surface of the N-type well region 322.

The N-MOS 321 includes the source region 325 and the drain region 326 formed by partial introduction of N-type or P-type impurities in a top layer of the P-type well region 323, the gate wiring 335, and so on. The gate wiring 335 is deposited on a part of a top surface of the P-type well region 323 excluding the source region 325 and the drain region 326, with the gate insulation film 328 of several hundreds of Å in thickness interposed between the gate wiring 335 and the top surface of the P-type well region 323. The gate wiring 335 is made of polysilicon of 3000 Å to 5000 Å in thickness deposited by the CVD method. A C-MOS logic is constructed with the P-MOS 320 and the N-MOS 321.

In the P-type well region 323, an N-MOS transistor 330 for driving an electrothermal conversion element (heating resistance element) is formed on a portion different from the portion including the N-MOS 321. The N-MOS transistor 330 includes a source region 332 and a drain region 331 partially provided in the top layer of the P-type well region 323 by the steps of introduction and diffusion of impurities, a gate wiring 333, and so on. The gate wiring 333 is deposited on a part of the top surface of the P-type well region 323 excluding the source region 332 and the drain region 331, with the gate insulation film 328 interposed between the gate wiring 333 and the top surface of the P-type well region 323.

In this example, the N-MOS transistor 330 is used as the transistor for driving the electrothermal conversion element. However, the transistor for driving is not limited to the N-MOS transistor 330, and any transistor may be used as long as the transistor has a capability of driving multiple electrothermal conversion elements individually and can implement the above-described fine configuration. Although the electrothermal conversion element and the transistor for driving the electrothermal conversion element are formed on the same substrate in this example, those may be formed on different substrates separately.

An oxide film separation region 324 is formed by field oxidation of 5000 Å to 10000 Å in thickness between the elements, such as between the P-MOS 320 and the N-MOS 321 and between the N-MOS 321 and the N-MOS transistor 330. The oxide film separation region 324 separates the elements. A portion of the oxide film separation region 324 corresponding to the heat-acting portion 311 functions as a heat-accumulating layer 334, which is the first layer on the silicon substrate 304.

An interlayer insulation film 336 including a PSG film, a BPSG film, or the like of about 7000 Å in thickness is formed by the CVD method on each surface of the elements such as the P-MOS 320, the N-MOS 321, and the N-MOS transistor 330. After the interlayer insulation film 336 is made flat by heat treatment, an Al electrode 337 as a first wiring layer is formed in a contact hole penetrating through the interlayer insulation film 336 and the gate insulation film 328. On surfaces of the interlayer insulation film 336 and the Al electrode 337, an interlayer insulation film 338 including an $SiO_2$ film of 10000 Å to 15000 Å in thickness is formed by a plasma CVD method. On the surface of the interlayer insulation film 338, a resistive layer 307 including a TaSiN film of about 500 Å in thickness is formed by a co-sputter method on portions corresponding to the heat-acting portion 311 and the N-MOS transistor 330. The resistive layer 307 is electrically connected with the Al electrode 337 near the drain region 331 via a through-hole formed in the interlayer insulation film 338. On the surface of the resistive layer 307, the wiring 308 of Al as a second wiring layer for a wiring to each electrothermal conversion element is formed. The protective layer 309 on the surfaces of the wiring 308, the resistive layer 307, and the interlayer insulation film 338 includes an SiN film of 3000 Å in thickness formed by the plasma CVD method. The cavitation-resistant film 310 deposited on the surface of the protective layer 309 includes a thin film of about 2000 Å in thickness, which is at least one metal selected from the group consisting of Ta, Fe, Ni, Cr, Ge, Ru, Zr, Ir, and the like. Various materials other than the above-described TaSiN such as $TaN_{0.8}$, CrSiN, TaAl, WSiN, and the like can be applied as long as the material can generate the film boiling in the liquid.

Figure 6A:
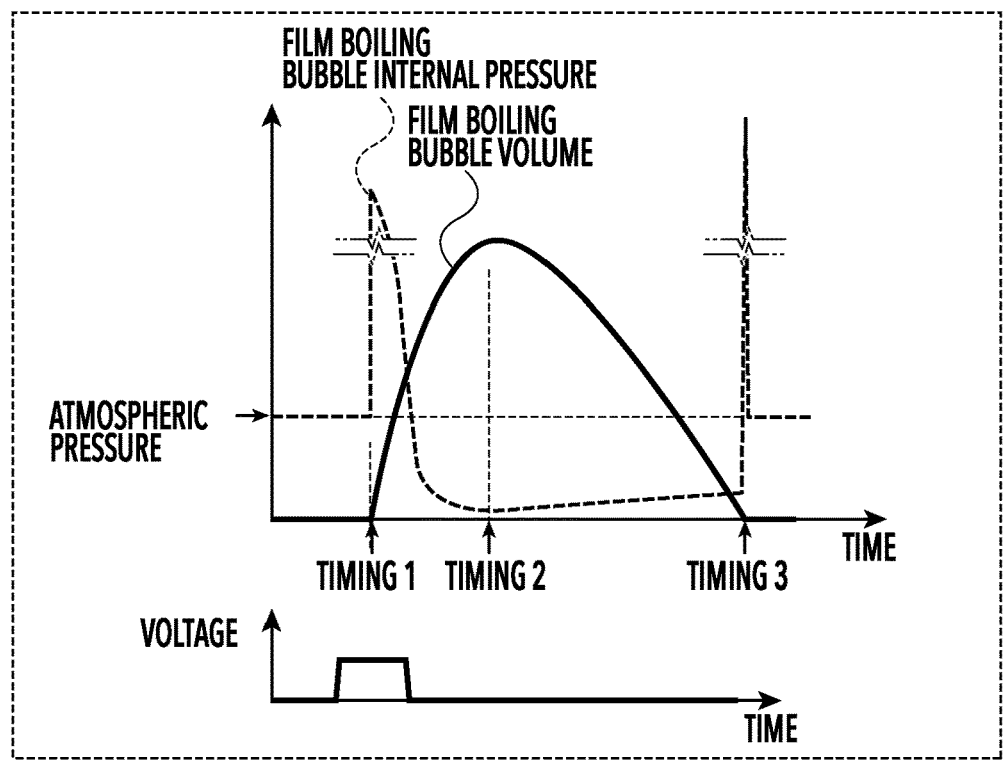
FIGS. 6A and 6B are diagrams for describing the states of film boiling on the heating element.
Figure 6B:
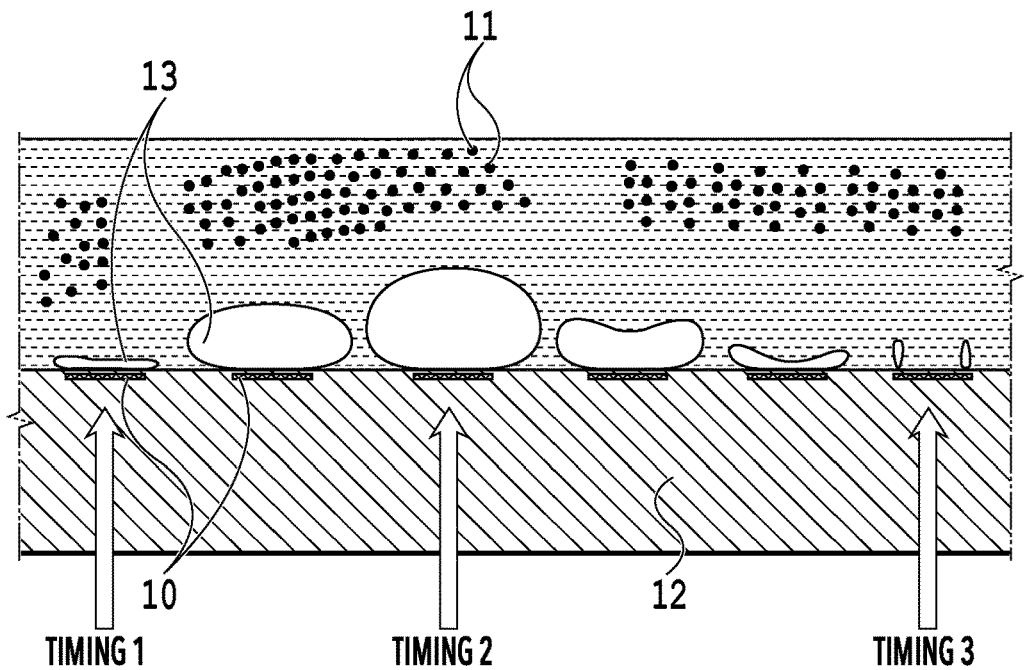

FIGS. 6A and 6B are diagrams illustrating the states of the film boiling when a predetermined voltage pulse is applied to the heating element 10. In this case, the case of generating the film boiling under atmospheric pressure is described. In FIG. 6A, the horizontal axis represents time. The vertical axis in the lower graph represents a voltage applied to the heating element 10, and the vertical axis in the upper graph represents the volume and the internal pressure of the film boiling bubble 13 generated by the film boiling. On the other hand, FIG. 6B illustrates the states of the film boiling bubble 13 in association with timings 1 to 3 shown in FIG. 6A. Each of the states is described below in chronological order. The UFBs 11 generated by the film boiling as described later are mainly generated near a surface of the film boiling bubble 13. The states illustrated in FIG. 6B are the states where the UFBs 11 generated by the generating unit 300 are resupplied to the dissolving unit 200 through the circulation route, and the liquid containing the UFBs 11 is resupplied to the liquid passage of the generating unit 300, as illustrated in FIG. 1.

Before a voltage is applied to the heating element 10, the atmospheric pressure is substantially maintained in the chamber 301. Once a voltage is applied to the heating element 10, the film boiling is generated in the liquid in contact with the heating element 10, and a thus-generated air bubble (hereinafter, referred to as the film boiling bubble 13) is expanded by a high pressure acting from inside (timing 1).

A bubbling pressure in this process is expected to be around 8 to 10 MPa, which is a value close to a saturation vapor pressure of water.

The time for applying a voltage (pulse width) is around 0.5 μsec to 10.0 μsec, and the film boiling bubble 13 is expanded by the inertia of the pressure obtained in timing 1 even after the voltage application. However, a negative pressure generated with the expansion is gradually increased inside the film boiling bubble 13, and the negative pressure acts in a direction to shrink the film boiling bubble 13. After a while, the volume of the film boiling bubble 13 becomes the maximum in timing 2 when the inertial force and the negative pressure are balanced, and thereafter the film boiling bubble 13 shrinks rapidly by the negative pressure.

In the disappearance of the film boiling bubble 13, the film boiling bubble 13 disappears not in the entire surface of the heating element 10 but in one or more extremely small regions. For this reason, on the heating element 10, further greater force than that in the bubbling in timing 1 is generated in the extremely small region in which the film boiling bubble 13 disappears (timing 3).

The generation, expansion, shrinkage, and disappearance of the film boiling bubble 13 as described above are repeated every time a voltage pulse is applied to the heating element 10, and new UFBs 11 are generated each time.

The states of generation of the UFBs 11 in each process of the generation, expansion, shrinkage, and disappearance of the film boiling bubble 13 are further described in detail with reference to FIGS. 7A to 10B.

FIGS. 7A to 7D are diagrams schematically illustrating the states of generation of the UFBs 11 caused by the generation and the expansion of the film boiling bubble 13. FIG. 7A illustrates the state before the application of a voltage pulse to the heating element 10. The liquid W in which the gas-dissolved liquids 3 are mixed flows inside the chamber 301.

FIG. 7B illustrates the state where a voltage is applied to the heating element 10, and the film boiling bubble 13 is evenly generated in almost all over the region of the heating element 10 in contact with the liquid W. When a voltage is applied, the surface temperature of the heating element 10 rapidly increases at a speed of 10° C./μsec. The film boiling occurs at a time point when the temperature reaches almost 300° C., and the film boiling bubble 13 is thus generated.

Thereafter, the surface temperature of the heating element 10 keeps increasing to around 600 to 800° C. during the pulse application, and the liquid around the film boiling bubble 13 is rapidly heated as well. In FIG. 7B, a region of the liquid that is around the film boiling bubble 13 and to be rapidly (in 100 μS or less) heated is indicated as a not-yet-bubbling high temperature region 14. The gas-dissolved liquid 3 within the not-yet-bubbling high temperature region 14 exceeds the thermal dissolution limit and substantially at the same time is precipitated to become the UFB. The thus-precipitated air bubbles have diameters of around 10 nm to 100 nm and large gas-liquid interface energy. Also, the liquid is interposed between the air bubbles. Thus, the air bubbles float independently in the liquid W without disappearing in a short time. The air bubbles generated by the thermal action from the generation to the expansion of the film boiling bubble 13 are called first UFBs 11A.

FIG. 7C illustrates the state where the film boiling bubble 13 is expanded. Even after the voltage pulse application to the heating element 10, the film boiling bubble 13 continues expansion by the inertia of the force obtained from the generation thereof, and the not-yet-bubbling high temperature region 14 is also moved and spread by the inertia.

Specifically, in the process of the expansion of the film boiling bubble 13, the gas-dissolved liquid 3 within the not-yet-bubbling high temperature region 14 is vaporized as a new air bubble and becomes the first UFB 11A.

FIG. 7D illustrates the state where the film boiling bubble 13 has the maximum volume. As the film boiling bubble 13 is expanded by the inertia, the negative pressure inside the film boiling bubble 13 is gradually increased along with the expansion, and the negative pressure acts to shrink the film boiling bubble 13. At a time point when the negative pressure and the inertial force are balanced, the volume of the film boiling bubble 13 becomes the maximum, and then the shrinkage is started.

Figure 8A:
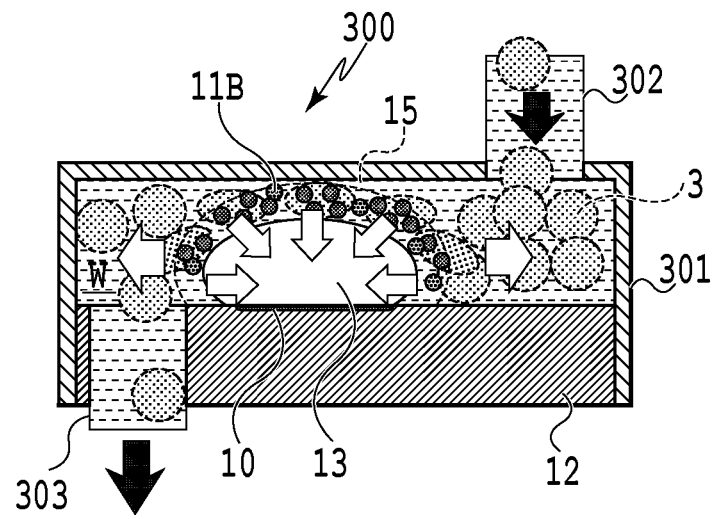
FIGS. 8A to 8C are diagrams illustrating the states of generation of UFBs caused by shrinkage of the film boiling bubble.
Figure 8B:
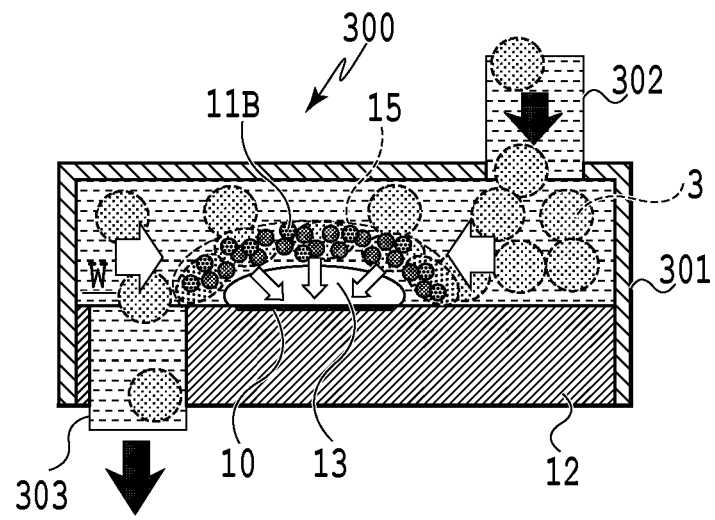
Figure 8C:
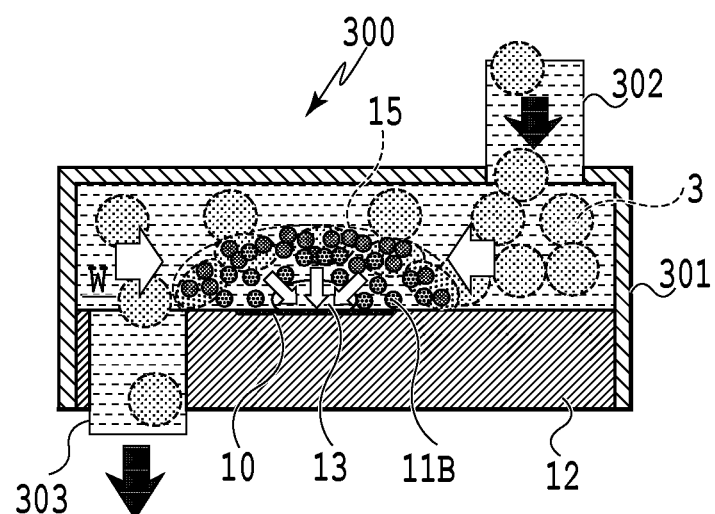
Figure 9A:
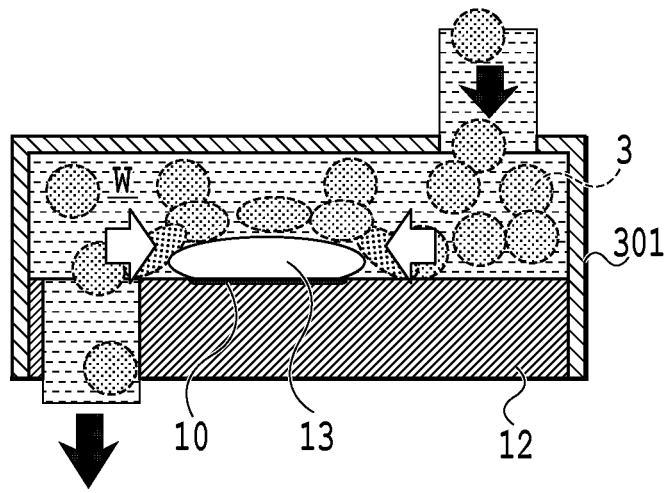
FIGS. 9A to 9C are diagrams illustrating the states of generation of UFBs caused by reheating of the liquid.
Figure 9B:
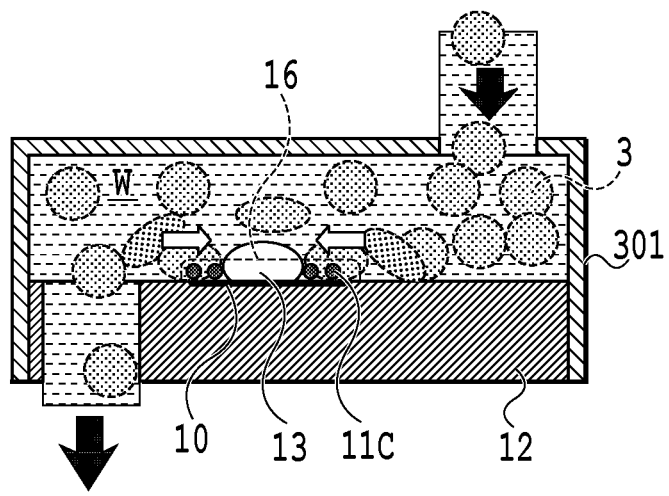
Figure 9C:
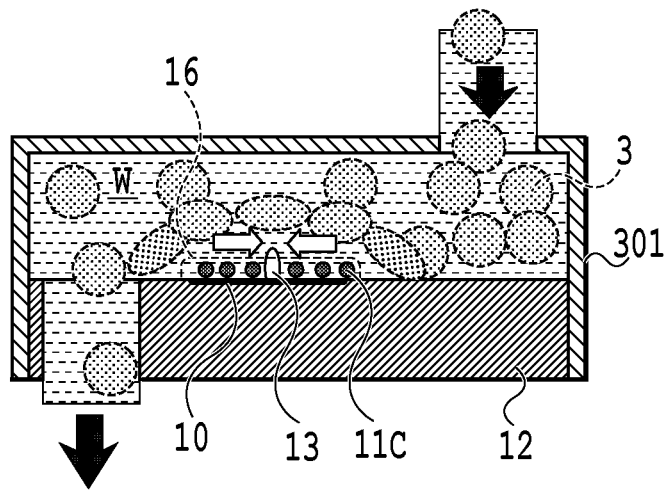

In the shrinking stage of the film boiling bubble 13, there are UFBs generated by the processes illustrated in FIGS. 8A to 8C (second UFBs 11B) and UFBs generated by the processes illustrated in FIGS. 9A to 9C (third UFBs 11C). It is considered that these two processes are made simultaneously.

FIGS. 8A to 8C are diagrams illustrating the states of generation of the UFBs 11 caused by the shrinkage of the film boiling bubble 13. FIG. 8A illustrates the state where the film boiling bubble 13 starts shrinking. Although the film boiling bubble 13 starts shrinking, the surrounding liquid W still has the inertial force in the expansion direction. Because of this, the inertial force acting in the direction of going away from the heating element 10 and the force going toward the heating element 10 caused by the shrinkage of the film boiling bubble 13 act in a surrounding region extremely close to the film boiling bubble 13, and the region is depressurized. The region is indicated in the drawings as a not-yet-bubbling negative pressure region 15.

The gas-dissolved liquid 3 within the not-yet-bubbling negative pressure region 15 exceeds the pressure dissolution limit and is vaporized to become an air bubble. The thus-vaporized air bubbles have diameters of about 100 nm and thereafter float independently in the liquid W without disappearing in a short time. The air bubbles vaporized by the pressure action during the shrinkage of the film boiling bubble 13 are called the second UFBs 11B.

FIG. 8B illustrates a process of the shrinkage of the film boiling bubble 13. The shrinking speed of the film boiling bubble 13 is accelerated by the negative pressure, and the not-yet-bubbling negative pressure region 15 is also moved along with the shrinkage of the film boiling bubble 13. Specifically, in the process of the shrinkage of the film boiling bubble 13, the gas-dissolved liquids 3 within a part over the not-yet-bubbling negative pressure region 15 are precipitated one after another and become the second UFBs 11B.

FIG. 8C illustrates the state immediately before the disappearance of the film boiling bubble 13. Although the moving speed of the surrounding liquid W is also increased by the accelerated shrinkage of the film boiling bubble 13, a pressure loss occurs due to a flow passage resistance in the chamber 301. As a result, the region occupied by the not-yet-bubbling negative pressure region 15 is further increased, and a number of the second UFBs 11B are generated.

FIGS. 9A to 9C are diagrams illustrating the states of generation of the UFBs by reheating of the liquid W during the shrinkage of the film boiling bubble 13. FIG. 9A illustrates the state where the surface of the heating element 10 is covered with the shrinking film boiling bubble 13.

FIG. 9B illustrates the state where the shrinkage of the film boiling bubble 13 has progressed, and a part of the surface of the heating element 10 comes in contact with the liquid W. In this state, there is heat left on the surface of the heating element 10, but the heat is not high enough to cause the film boiling even if the liquid W comes in contact with the surface. A region of the liquid to be heated by coming in contact with the surface of the heating element 10 is indicated in the drawings as a not-yet-bubbling reheated region 16. Although the film boiling is not made, the gas-dissolved liquid 3 within the not-yet-bubbling reheated region 16 exceeds the thermal dissolution limit and is vaporized. The air bubbles generated by the reheating of the liquid W during the shrinkage of the film boiling bubble 13 are called the third UFBs 11C.

FIG. 9C illustrates the state where the shrinkage of the film boiling bubble 13 has further progressed. The smaller the film boiling bubble 13, the greater the region of the heating element 10 in contact with the liquid W, and the third UFBs 11C are generated until the film boiling bubble 13 disappears.

Figure 10A:
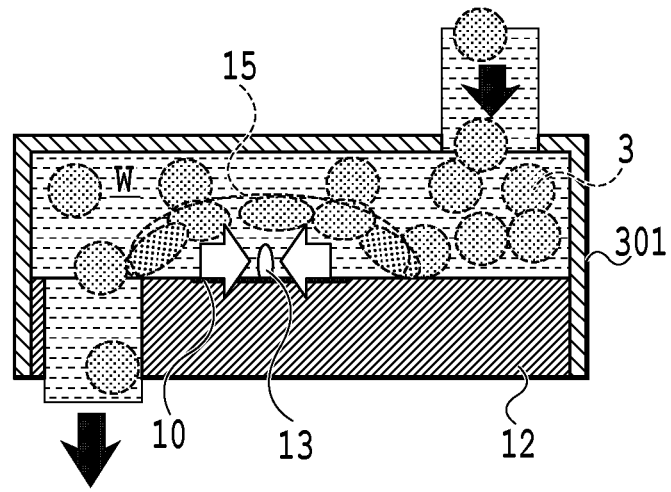
FIGS. 10A and 10B are diagrams illustrating the states of generation of UFBs caused by shock waves made by disappearance of the bubble generated by the film boiling.
Figure 10B:
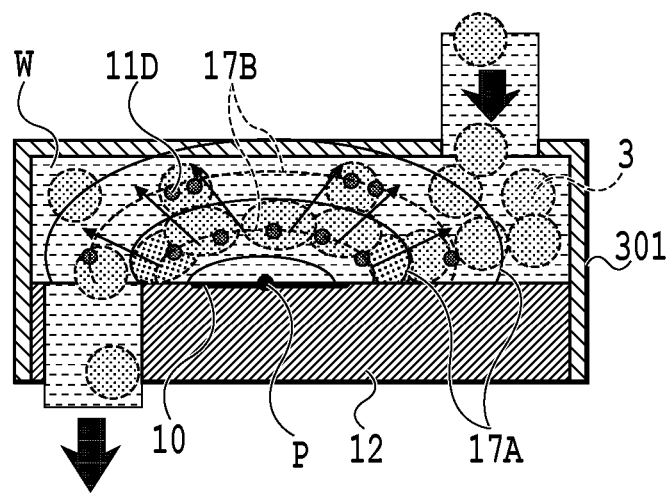

FIGS. 10A and 10B are diagrams illustrating the states of generation of the UFBs caused by an impact from the disappearance of the film boiling bubble 13 generated by the film boiling (that is, a type of cavitation). FIG. 10A illustrates the state immediately before the disappearance of the film boiling bubble 13. In this state, the film boiling bubble 13 shrinks rapidly by the internal negative pressure, and the not-yet-bubbling negative pressure region 15 surrounds the film boiling bubble 13.

FIG. 10B illustrates the state immediately after the film boiling bubble 13 disappears at a point P. When the film boiling bubble 13 disappears, acoustic waves ripple concentrically from the point P as a starting point due to the impact of the disappearance. The acoustic wave is a collective term of an elastic wave that is propagated through anything regardless of gas, liquid, and solid. Compression waves of the liquid W, which are a high pressure surface 17A and a low pressure surface 17B of the liquid W, are propagated alternately.

In this case, the gas-dissolved liquid 3 within the not-yet-bubbling negative pressure region 15 is resonated by the shock waves made by the disappearance of the film boiling bubble 13, and the gas-dissolved liquid 3 exceeds the pressure dissolution limit and the phase transition is made in timing when the low pressure surface 17B passes therethrough. Specifically, a number of air bubbles are vaporized in the not-yet-bubbling negative pressure region 15 simultaneously with the disappearance of the film boiling bubble 13. The air bubbles generated by the shock waves made by the disappearance of the film boiling bubble 13 are called fourth UFBs 11D.

The fourth UFBs 11D generated by the shock waves made by the disappearance of the film boiling bubble 13 suddenly appear in an extremely short time (1 μS or less) in an extremely narrow thin film-shaped region. The diameter is sufficiently smaller than that of the first to third UFBs, and the gas-liquid interface energy is higher than that of the first to third UFBs. For this reason, it is considered that the fourth UFBs 11D have different characteristics from the first to third UFBs 11A to 11C and generate different effects.

Additionally, the fourth UFBs 11D are evenly generated in many parts of the region of the concentric sphere in which the shock waves are propagated, and the fourth UFBs 11D evenly exist in the chamber 301 from the generation thereof. Although many first to third UFBs already exist in the timing of the generation of the fourth UFBs 11D, the presence of the first to third UFBs does not affect the generation of the fourth UFBs 11D greatly. It is also considered that the first to third UFBs do not disappear due to the generation of the fourth UFBs 11D.

Figure 11A:
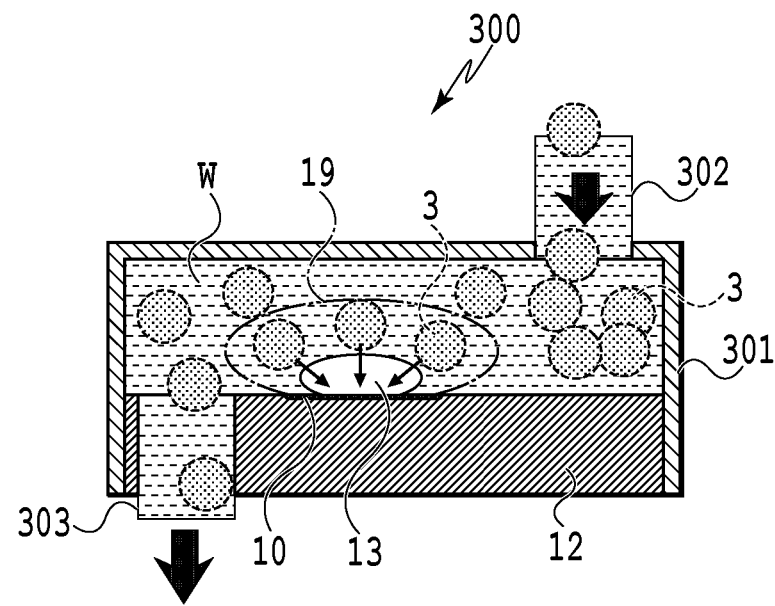
FIGS. 11A and 11B are diagrams illustrating the states of generation of UFBs caused by a change in saturation solubility.
Figure 11B:
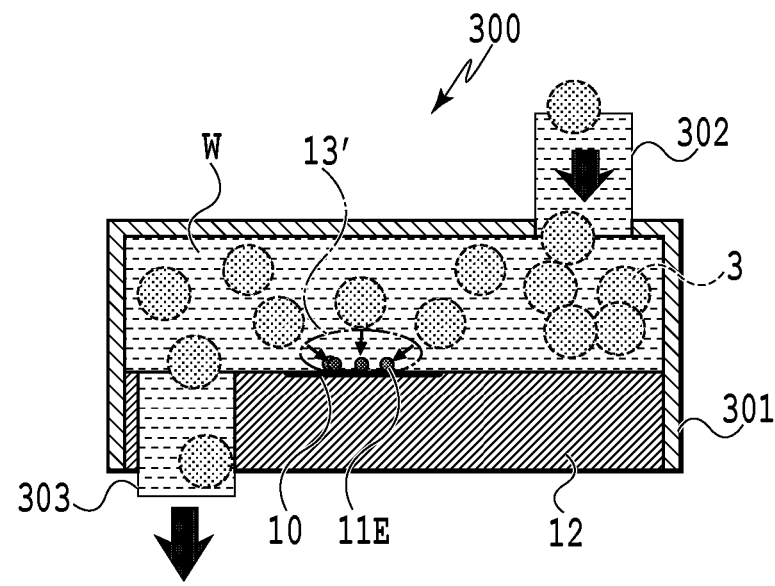

FIGS. 11A and 11B are diagrams illustrating the states of generation of UFBs caused by a change in saturation solubility. FIG. 11A illustrates the state where a film boiling bubble 13 is generated by film boiling. With the generation of the film boiling bubble 13, the liquid W around it is also heated, and around the film boiling bubble 13 is formed a high-temperature region 19 where the temperature is higher than the other region. The higher the temperature of the liquid W, the lower the saturation solubility of the liquid. Thus, the saturation solubility in the high-temperature region 19 is lower than that in the other region, providing a supersaturated state, in which phase transition to gas occurs more easily. Then, the gas-dissolved liquid 3 in such a supersaturated state undergoes phase transition by contacting the film boiling bubble 13, and is precipitated as UFBs. In FIG. 11A, the arrows indicate the direction in which the gas-dissolved liquid 3 is precipitated. The air bubbles generated by the change in saturation solubility around the film boiling bubble 13 are called fifth UFBs 11E.

FIG. 11B illustrates the state where the film boiling bubble 13 has disappeared. The fifth UFBs 11E generated as a result of the contact with the film boiling bubble 13 are pulled in the direction of the heating element 10 upon the disappearance of the film boiling bubble 13, so that a region 13' that has been occupied by the film boiling bubble 13 is now filled with the liquid W. Of the precipitated UFBs, those that are not re-dissolved into the liquid W remain as the fifth UFBs 11E.

As described above, it is expected that the UFBs 11 are generated in the multiple stages from the generation to the disappearance of the film boiling bubble 13 by the heat generation of the heating element 10. The first UFBs 11A, the second UFBs 11B, the third UFBs 11C, and the fifth UFBs 11E are generated near the surface of the film boiling bubble generated by the film boiling. In this case, near means a region within about 20 μm from the surface of the film boiling bubble. The fourth UFBs 11D are generated in a region through which the shock waves are propagated when the air bubble disappears. Although the above example illustrates the stages to the disappearance of the film boiling bubble 13, the way of generating the UFBs is not limited thereto. For example, with the generated film boiling bubble 13 communicating with the atmospheric air before the bubble disappearance, the UFBs can be generated also if the film boiling bubble 13 does not reach the disappearance.

Next, remaining properties of the UFBs are described. The higher the temperature of the liquid, the lower the dissolution properties of the gas components, and the lower the temperature, the higher the dissolution properties of the gas components. In other words, the phase transition of the dissolved gas components is prompted and the generation of the UFBs becomes easier as the temperature of the liquid is higher. The temperature of the liquid and the solubility of the gas are in the inverse relationship, and the gas exceeding the saturation solubility is transformed into air bubbles and appeared in the liquid as the liquid temperature increases.

Therefore, when the temperature of the liquid rapidly increases from normal temperature, the dissolution properties are decreased without stopping, and the generation of the UFBs starts. The thermal dissolution properties are decreased as the temperature increases, and a number of the UFBs are generated.

Conversely, when the temperature of the liquid decreases from normal temperature, the dissolution properties of the gas are increased, and the generated UFBs are more likely to be liquefied. However, such temperature is sufficiently lower than normal temperature. Additionally, since the once generated UFBs have a high internal pressure and large gas-liquid interface energy even when the temperature of the liquid decreases, it is highly unlikely that there is exerted a sufficiently high pressure to break such a gas-liquid interface. In other words, the once generated UFBs do not disappear easily as long as the liquid is stored at normal temperature and normal pressure.

In this disclosure, the first UFBs 11A described with FIGS. 7A to 7C, the third UFBs 11C described with FIGS. 9A to 9C, and the fifth UFBs 11E described with FIGS. 11A to 11B can be described as UFBs that are generated by utilizing such thermal dissolution properties of gas.

On the other hand, in the relationship between the pressure and the dissolution properties of liquid, the higher the pressure of the liquid, the higher the dissolution properties of the gas, and the lower the pressure, the lower the dissolution properties. In other words, the phase transition to the gas of the gas-dissolved liquid dissolved in the liquid is prompted and the generation of the UFBs becomes easier as the pressure of the liquid is lower. Once the pressure of the liquid becomes lower than normal pressure, the dissolution properties are decreased instantly, and the generation of the UFBs starts. The pressure dissolution properties are decreased as the pressure decreases, and a number of the UFBs are generated.

Conversely, when the pressure of the liquid increases to be higher than normal pressure, the dissolution properties of the gas are increased, and the generated UFBs are more likely to be liquefied. However, such pressure is sufficiently higher than the atmospheric pressure. Additionally, since the once generated UFBs have a high internal pressure and large gas-liquid interface energy even when the pressure of the liquid increases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the second UFBs 11B described with FIGS. 8A to 8C and the fourth UFBs 11D described with FIGS. 10A to 10B can be described as UFBs that are generated by utilizing such pressure dissolution properties of gas.

Those first to fourth UFBs generated by different causes are described individually above; however, the above-described generation causes occur simultaneously with the event of the film boiling. Thus, at least two types of the first to the fourth UFBs may be generated at the same time, and these generation causes may cooperate to generate the UFBs. It should be noted that it is common for all the generation causes to be induced by the volume change of the film boiling bubble generated by the film boiling phenomenon. In this specification, the method of generating the UFBs by utilizing the film boiling caused by the rapid heating as described above is referred to as a thermal-ultrafine bubble (T-UFB) generating method. Additionally, the UFBs generated by the T-UFB generating method are referred to as T-UFBs, and the liquid containing the T-UFBs generated by the T-UFB generating method is referred to as a T-UFB-containing liquid.

Almost all the air bubbles generated by the T-UFB generating method are 1.0 μm or less, and milli-bubbles and microbubbles are unlikely to be generated. That is, the T-UFB generating method allows dominant and efficient generation of the UFBs. Additionally, the T-UFBs generated by the T-UFB generating method have larger gas-liquid interface energy than that of the UFBs generated by a conventional method, and the T-UFBs do not disappear easily as long as being stored at normal temperature and normal pressure. Moreover, even if new T-UFBs are generated by new film boiling, it is possible to prevent disappearance of the already generated T-UFBs due to the impact from the new generation. That is, it can be said that the number and the concentration of the T-UFBs contained in the T-UFB-containing liquid have the hysteresis properties depending on the number of times the film boiling is made in the T-UFB-containing liquid. In other words, it is possible to adjust the concentration of the T-UFBs contained in the T-UFB-containing liquid by controlling the number of the heating elements provided in the T-UFB generating unit 300 and the number of the voltage pulse application to the heating elements.

Reference to FIG. 1 is made again. Once the T-UFB-containing liquid W with a desired UFB concentration is generated in the T-UFB generating unit 300, the UFB-containing liquid W is supplied to the post-processing unit 400.

Figure 12A:
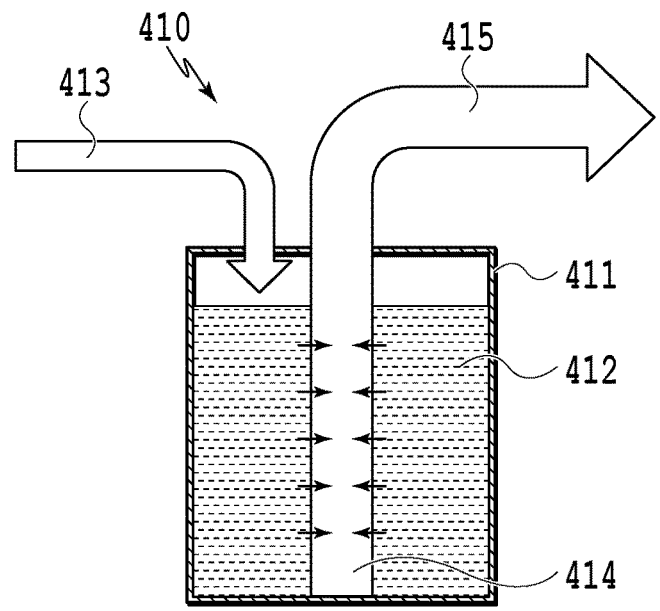
FIGS. 12A to 12C are diagrams illustrating a configuration example of a post-processing unit.
Figure 12B:
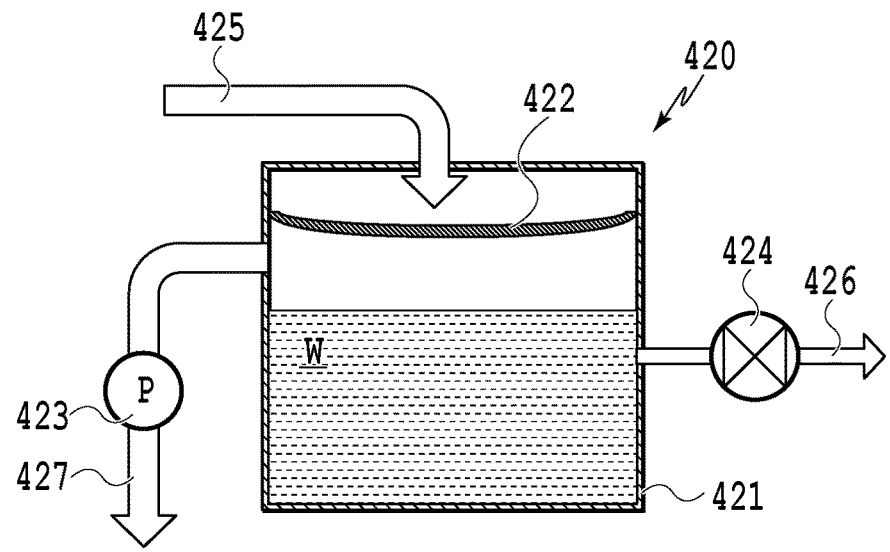
Figure 12C:
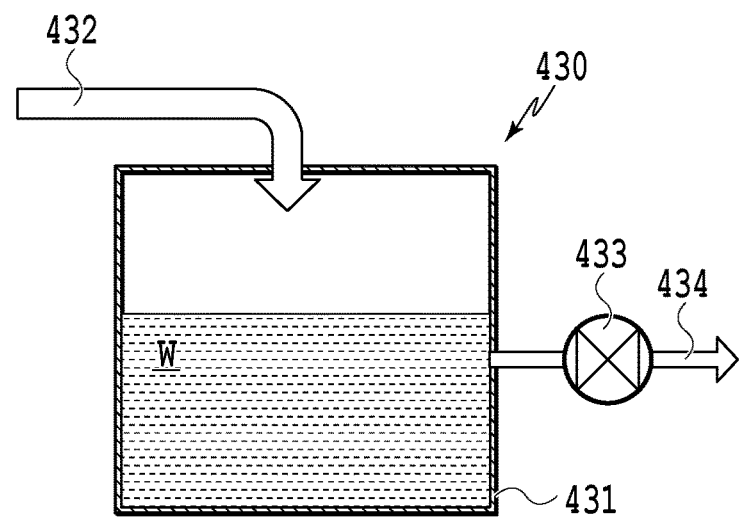

FIGS. 12A to 12C are diagrams illustrating configuration examples of the post-processing unit 400. The post-processing unit 400 removes impurities in the UFB-containing liquid W in stages in the order from inorganic ions, organic substances, and insoluble solid substances.

FIG. 12A illustrates a first post-processing mechanism 410 that removes the inorganic ions. The first post-processing mechanism 410 includes an exchange container 411, cation exchange resins 412, a liquid introduction passage 413, a collecting pipe 414, and a liquid discharge passage 415. The exchange container 411 stores the cation exchange resins 412. The UFB-containing liquid W generated by the T-UFB generating unit 300 is injected to the exchange container 411 through the liquid introduction passage 413 and absorbed into the cation exchange resins 412 such that the cations as the impurities are removed. Such impurities include metal materials peeled off from the element substrate 12 of the T-UFB generating unit 300, such as $SiO_2$, SiN, SiC, Ta, $Al_2O_3$, $Ta_2O_5$, and Ir.

The cation exchange resins 412 are synthetic resins in which a functional group (ion exchange group) is introduced in a high polymer matrix having a three-dimensional network, and the appearance of the synthetic resins are spherical particles of around 0.4 to 0.7 mm. A general high polymer matrix is the styrene-divinylbenzene copolymer, and the functional group may be that of methacrylic acid series and acrylic acid series, for example. However, the above material is an example. As long as the material can remove desired inorganic ions effectively, the above material can be changed to various materials. The UFB-containing liquid W absorbed in the cation exchange resins 412 to remove the inorganic ions is collected by the collecting pipe 414 and transferred to the next step through the liquid discharge passage 415. In this process, not all the inorganic ions contained in the UFB-containing liquid W supplied from the liquid introduction passage 413 need to be removed as long as at least a part of the inorganic ions are removed.

FIG. 12B illustrates a second post-processing mechanism 420 that removes the organic substances. The second post-processing mechanism 420 includes a storage container 421, a filtration filter 422, a vacuum pump 423, a valve 424, a liquid introduction passage 425, a liquid discharge passage 426, and an air suction passage 427. Inside of the storage container 421 is divided into upper and lower two regions by the filtration filter 422. The liquid introduction passage 425 is connected to the upper region of the upper and lower two regions, and the air suction passage 427 and the liquid discharge passage 426 are connected to the lower region thereof. Once the vacuum pump 423 is driven with the valve 424 closed, the air in the storage container 421 is discharged through the air suction passage 427 to make the pressure inside the storage container 421 negative pressure, and the UFB-containing liquid W is thereafter introduced from the liquid introduction passage 425. Then, the UFB-containing liquid W from which the impurities are removed by the filtration filter 422 is reserved into the storage container 421.

The impurities removed by the filtration filter 422 include organic materials that may be mixed at a tube or each unit, such as organic compounds including silicon, siloxane, and epoxy, for example. A filter film usable for the filtration filter 422 includes a filter of a sub-µm-mesh (a filter of 1 µm or smaller in mesh diameter) that can remove bacteria, and a filter of a nm-mesh that can remove virus. The filtration filter having such a fine opening diameter may remove air bubbles larger than the opening diameter of the filter. Particularly, there may be the case where the filter is clogged by the fine air bubbles adsorbed to the openings (mesh) of the filter, which may slowdown the filtering speed. However, as described above, most of the air bubbles generated by the T-UFB generating method described in the present disclosure are in the size of 1 µm or smaller in diameter, and milli-bubbles and microbubbles are not likely to be generated. That is, since the probability of generating milli-bubbles and microbubbles is extremely low, it is possible to suppress the slowdown in the filtering speed due to the adsorption of the air bubbles to the filter. For this reason, it is favorable to apply the filtration filter 422 provided with the filter of 1 µm or smaller in mesh diameter to the system having the T-UFB generating method.

Examples of the filtration applicable to this embodiment may be a so-called dead-end filtration and cross-flow filtration. In the dead-end filtration, the direction of the flow of the supplied liquid and the direction of the flow of the filtration liquid passing through the filter openings are the same, and specifically, the directions of the flows are made along with each other. In contrast, in the cross-flow filtration, the supplied liquid flows in a direction along a filter surface, and specifically, the direction of the flow of the supplied liquid and the direction of the flow of the filtration liquid passing through the filter openings are crossed with each other. It is preferable to apply the cross-flow filtration to suppress the adsorption of the air bubbles to the filter openings.

After a certain amount of the UFB-containing liquid W is reserved in the storage container 421, the vacuum pump 423 is stopped and the valve 424 is opened to transfer the T-UFB-containing liquid in the storage container 421 to the next step through the liquid discharge passage 426. Although the vacuum filtration method is employed as the method of removing the organic impurities herein, a gravity filtration method and a pressurized filtration can also be employed as the filtration method using a filter, for example.

FIG. 12C illustrates a third post-processing mechanism 430 that removes the insoluble solid substances. The third post-processing mechanism 430 includes a precipitation container 431, a liquid introduction passage 432, a valve 433, and a liquid discharge passage 434.

First, a predetermined amount of the UFB-containing liquid W is reserved into the precipitation container 431 through the liquid introduction passage 432 with the valve 433 closed, and leaving it for a while. Meanwhile, the solid substances in the UFB-containing liquid W are precipitated onto the bottom of the precipitation container 431 by gravity. Among the bubbles in the UFB-containing liquid, relatively large bubbles such as microbubbles are raised to the liquid surface by the buoyancy and also removed from the UFB-containing liquid. After a lapse of sufficient time, the valve 433 is opened, and the UFB-containing liquid W from which the solid substances and large bubbles are removed is transferred to the collecting unit 500 through the liquid discharge passage 434. The example of applying the three post-processing mechanisms in sequence is shown in this disclosure; however, it is not limited thereto, and the order of the three post-processing mechanisms may be changed, or at least one needed post-processing mechanism may be employed.

Refer to FIG. 1 again. The T-UFB-containing liquid W from which the impurities are removed by the post-processing unit 400 may be directly transferred to the collecting unit 500 or may be put back to the dissolving unit 200 again. In the latter case, the gas dissolution concentration of the T-UFB-containing liquid W that is decreased due to the generation of the T-UFBs can be compensated to the saturated state again by the dissolving unit 200. If new T-UFBs are generated by the T-UFB generating unit 300 after the compensation, it is possible to further increase the concentration of the UFBs contained in the T-UFB-containing liquid with the above-described properties. That is, it is possible to increase the concentration of the contained UFBs by the number of circulations through the dissolving unit 200, the T-UFB generating unit 300, and the post-processing unit 400, and it is possible to transfer the UFB-containing liquid W to the collecting unit 500 after a predetermined concentration of the contained UFBs is obtained. This disclosure shows a form in which the UFB-containing liquid processed by the post-processing unit 400 is put back to the dissolving unit 200 and circulated; however, it is not limited thereto, and the UFB-containing liquid after passing through the T-UFB generating unit may be put back again to the dissolving unit 200 before being supplied to the post-processing unit 400 such that the post-processing is performed by the post-processing unit 400 after the T-UFB concentration is increased through multiple times of circulation, for example.

The collecting unit 500 collects and preserves the UFB-containing liquid W transferred from the post-processing unit 400. The T-UFB-containing liquid collected by the collecting unit 500 is a UFB-containing liquid with high purity from which various impurities are removed.

In the collecting unit 500, the UFB-containing liquid W may be classified by the size of the T-UFBs by performing some stages of filtration processing. Since it is expected that the temperature of the T-UFB-containing liquid W obtained by the T-UFB method is higher than normal temperature, the collecting unit 500 may be provided with a cooling unit. The cooling unit may be provided to a part of the post-processing unit 400.

The schematic description of the UFB generating apparatus 1 is given above; however, it is needless to say that the illustrated multiple units can be changed, and not all of them need to be prepared. Depending on the type of the liquid W and the gas G to be used and the intended use of the T-UFB-containing liquid to be generated, a part of the above-described units may be omitted, or another unit other than the above-described units may be added.

For example, when the gas to be contained by the UFBs is the atmospheric air, the degassing unit as the pre-processing unit 100 and the dissolving unit 200 can be omitted. On the other hand, when multiple kinds of gases are desired to be contained by the UFBs, another dissolving unit 200 may be added.

The units for removing the impurities as described in FIGS. 12A to 12C may be provided upstream of the T-UFB generating unit 300 or may be provided both upstream and downstream thereof. When the liquid to be supplied to the UFB generating apparatus is tap water, rain water, contaminated water, or the like, there may be included organic and inorganic impurities in the liquid. If such a liquid W including the impurities is supplied to the T-UFB generating unit 300, there is a risk of deteriorating the heating element 10 and inducing the salting-out phenomenon. With the mechanisms as illustrated in FIGS. 11A to 11C provided upstream of the T-UFB generating unit 300, it is possible to remove the above-described impurities previously.

<<Liquid and Gas Usable for T-UFB-Containing Liquid>>

Now, the liquid W usable for generating the T-UFB-containing liquid is described. The liquid W usable is, for example, pure water, ion exchange water, distilled water, bioactive water, magnetic active water, lotion, tap water, sea water, river water, clean and sewage water, lake water, underground water, rain water, and so on. A mixed liquid containing the above liquid and the like is also usable. A mixed solvent containing water and soluble organic solvent can be also used. The soluble organic solvent to be used by being mixed with water is not particularly limited; however, the followings can be a specific example thereof. An alkyl alcohol group of the carbon number of 1 to 4 including methyl alcohol, ethyl alcohol, n-propyl alcohol, isopropyl alcohol, n-butyl alcohol, sec-butyl alcohol, and tert-butyl alcohol. An amide group including N-methyl-2-pyrrolidone, 2-pyrrolidone, 1,3-dimethyl-2-imidazolidinone, N,N-dimethylformamide, and N,N-dimethylacetamide. A keton group or a ketoalcohol group including acetone and diacetone alcohol. A cyclic ether group including tetrahydrofuran and dioxane. A glycol group including ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol. A group of lower alkyl ether of polyhydric alcohol including ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. A polyalkylene glycol group including polyethylene glycol and polypropylene glycol. A triol group including glycerin, 1,2,6-hexanetriol, and trimethylolpropane. These soluble organic solvents can be used individually, or two or more of them can be used together.

A gas component that can be introduced into the dissolving unit 200 is, for example, hydrogen, helium, oxygen, nitrogen, methane, fluorine, neon, carbon dioxide, ozone, argon, chlorine, ethane, propane, air, and so on. The gas component may be a mixed gas containing some of the above. Additionally, it is not necessary for the dissolving unit 200 to dissolve a substance in a gas state, and the dissolving unit 200 may dissolve a liquid or a solid containing desired components into the liquid W. The dissolution in this case may be spontaneous dissolution, dissolution caused by pressure application, or dissolution caused by hydration, ionization, and chemical reaction due to electrolytic dissociation.

<<Effects of T-UFB Generating Method>>

Next, the characteristics and the effects of the above-described T-UFB generating method are described by comparing with a conventional UFB generating method. For example, in a conventional air bubble generating apparatus as represented by the Venturi method, a mechanical depressurizing structure such as a depressurizing nozzle is provided in a part of a flow passage. A liquid flows at a predetermined pressure to pass through the depressurizing structure, and air bubbles of various sizes are generated in a downstream region of the depressurizing structure.

In this case, among the generated air bubbles, since the relatively large bubbles such as milli-bubbles and microbubbles are affected by the buoyancy, such bubbles rise to the liquid surface and disappear. Even the UFBs that are not affected by the buoyancy may also disappear with the milli-bubbles and microbubbles since the gas-liquid interface energy of the UFBs is not very large. Additionally, even if the above-described depressurizing structures are arranged in series, and the same liquid flows through the depressurizing structures repeatedly, it is impossible to store for a long time the UFBs of the number corresponding to the number of repetitions. In other words, it has been difficult for the UFB-containing liquid generated by the conventional UFB generating method to maintain the concentration of the contained UFBs at a predetermined value for a long time.

In contrast, in the T-UFB generating method utilizing the film boiling, a rapid temperature change from normal temperature to about 300° C. and a rapid pressure change from normal pressure to around a several megapascal occur locally in a part extremely close to the heating element. The heating element is a rectangular shape having one side of around several tens to hundreds of μm. It is around $1/10$ to $1/1000$ of the size of a conventional UFB generating unit. Additionally, with the gas-dissolved liquid within the extremely thin film region of the film boiling bubble surface exceeding the thermal dissolution limit or the pressure dissolution limit instantaneously (in an extremely short time under microseconds), the phase transition occurs and the gas-dissolved liquid is precipitated as the UFBs. In this case, the relatively large bubbles such as milli-bubbles and microbubbles are hardly generated, and the liquid contains the UFBs of about 100 nm in diameter with extremely high purity. Moreover, since the T-UFBs generated in this way have sufficiently large gas-liquid interface energy, the T-UFBs are not broken easily under the normal environment and can be stored for a long time.

Particularly, the present disclosure using the film boiling phenomenon that enables local formation of a gas interface in the liquid can form an interface in a part of the liquid close to the heating element without affecting the entire liquid region, and a region on which the thermal and pressure actions performed can be extremely local. As a result, it is possible to stably generate desired UFBs. With further more conditions for generating the UFBs applied to the generation liquid through the liquid circulation, it is possible to additionally generate new UFBs with small effects on the already-made UFBs. As a result, it is possible to produce a UFB liquid of a desired size and concentration relatively easily.

Moreover, since the T-UFB generating method has the above-described hysteresis properties, it is possible to increase the concentration to a desired concentration while keeping the high purity. In other words, according to the T-UFB generating method, it is possible to efficiently generate a long-time storable UFB-containing liquid with high purity and high concentration.

<<Specific Usage of T-UFB-Containing Liquid>>

In general, applications of the ultrafine bubble-containing liquids are distinguished by the type of the containing gas. Any type of gas can make the UFBs as long as an amount of around PPM to BPM of the gas can be dissolved in the liquid. For example, the ultrafine bubble-containing liquids can be applied to the following applications.

A UFB-containing liquid containing air can be preferably applied to cleansing in the industrial, agricultural and fishery, and medical scenes and the like, and to cultivation of plants and agricultural and fishery products.

A UFB-containing liquid containing ozone can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing nitrogen can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing oxygen can be preferably applied to cleansing application in the industrial, agricultural and fishery, and medical scenes and the like, and to cultivation of plants and agricultural and fishery products.

A UFB-containing liquid containing carbon dioxide can be preferably applied to not only cleansing application in the industrial, agricultural and fishery, and medical scenes and the like, but to also applications intended to disinfection, sterilization, and decontamination, for example.

A UFB-containing liquid containing perfluorocarbons as a medical gas can be preferably applied to ultrasonic diagnosis and treatment. As described above, the UFB-containing liquids can exert the effects in various fields of medical, chemical, dental, food, industrial, agricultural and fishery, and so on.

In each of the applications, the purity and the concentration of the UFBs contained in the UFB-containing liquid are important for quickly and reliably exert the effect of the UFB-containing liquid. In other words, unprecedented effects can be expected in various fields by utilizing the T-UFB generating method that enables generation of the UFB-containing liquid with high purity and desired concentration. Here is below a list of the applications in which the T-UFB generating method and the T-UFB-containing liquid are expected to be preferably applicable.

(A) Liquid Purification Application

With the T-UFB generating unit provided to a water clarification unit, enhancement of an effect of water clarification and an effect of purification of PH adjustment liquid is expected. The T-UFB generating unit may also be provided to a carbonated water server.

With the T-UFB generating unit provided to a humidifier, aroma diffuser, coffee maker, and the like, enhancement of a humidifying effect, a deodorant effect, and a scent spreading effect in a room is expected.

If the UFB-containing liquid in which an ozone gas is dissolved by the dissolving unit is generated and is used for dental treatment, burn treatment, and wound treatment using an endoscope, enhancement of a medical cleansing effect and an antiseptic effect is expected.

With the T-UFB generating unit provided to a water storage tank of a condominium, enhancement of a water clarification effect and chlorine removing effect of drinking water to be stored for a long time is expected.

If the T-UFB-containing liquid containing ozone or carbon dioxide is used for brewing process of Japanese sake, shochu, wine, and so on in which the high-temperature pasteurization processing cannot be performed, more efficient pasteurization processing than that with the conventional liquid is expected.

If the UFB-containing liquid is mixed into the ingredient in a production process of the foods for specified health use and the foods with functional claims, the pasteurization processing is possible, and thus it is possible to provide safe and functional foods without a loss of flavor.

With the T-UFB generating unit provided to a supplying route of sea water and fresh water for cultivation in a cultivation place of fishery products such as fish and pearl, prompting of spawning and growing of the fishery products is expected.

With the T-UFB generating unit provided in a purification process of water for food preservation, enhancement of the preservation state of the food is expected.

With the T-UFB generating unit provided in a bleaching unit for bleaching pool water or underground water, a higher bleaching effect is expected.

With the T-UFB-containing liquid used for repairing a crack of a concrete member, enhancement of the effect of crack repairment is expected.

With the T-UFBs contained in liquid fuel for a machine using liquid fuel (such as automobile, vessel, and airplane), enhancement of energy efficiency of the fuel is expected.

(B) Cleansing Application

Recently, the UFB-containing liquids have been receiving attention as cleansing water for removing soils and the like attached to clothing. If the T-UFB generating unit described in the above embodiment is provided to a washing machine, and the UFB-containing liquid with higher purity and better permeability than the conventional liquid is supplied to the washing tub, further enhancement of detergency is expected.

With the T-UFB generating unit provided to a bath shower and a bedpan washer, not only a cleansing effect on all kinds of animals including human body but also an effect of prompting contamination removal of a water stain and a mold on a bathroom and a bedpan are expected.

With the T-UFB generating unit provided to a window washer for automobiles, a high-pressure washer for cleansing wall members and the like, a car washer, a dishwasher, a food washer, and the like, further enhancement of the cleansing effects thereof is expected.

With the T-UFB-containing liquid used for cleansing and maintenance of parts produced in a factory including a burring step after pressing, enhancement of the cleansing effect is expected.

In production of semiconductor elements, if the T-UFB-containing liquid is used as polishing water for a wafer, enhancement of the polishing effect is expected. Additionally, if the T-UFB-containing liquid is used in a resist removal step, prompting of peeling of resist that is not peeled off easily is enhanced.

With the T-UFB generating unit is provided to machines for cleansing and decontaminating medical machines such as a medical robot, a dental treatment unit, an organ preservation container, and the like, enhancement of the cleansing effect and the decontamination effect of the machines is expected. The T-UFB generating unit is also applicable to treatment of animals.

(C) Pharmaceutical Application

If the T-UFB-containing liquid is contained in cosmetics and the like, permeation into subcutaneous cells is prompted, and additives that give bad effects to skin such as preservative and surfactant can be reduced greatly. As a result, it is possible to provide safer and more functional cosmetics.

If a high concentration nanobubble preparation containing the T-UFBs is used for contrasts for medical examination apparatuses such as a CT and an MRI, reflected light of X-rays and ultrasonic waves can be efficiently used. This makes it possible to capture a more detailed image that is usable for initial diagnosis of a cancer and the like.

If a high concentration nanobubble water containing the T-UFBs is used for a ultrasonic wave treatment machine called high-intensity focused ultrasound (HIFU), the irradiation power of ultrasonic waves can be reduced, and thus the treatment can be made more non-invasive. Particularly, it is possible to reduce the damage to normal tissues.

It is possible to create a nanobubble preparation by using high concentration nanobubbles containing the T-UFBs as a source, modifying a phospholipid forming a liposome in a negative electric charge region around the air bubble, and applying various medical substances (such as DNA and RNA) through the phospholipid.

If a drug containing high concentration nanobubble water made by the T-UFB generation is transferred into a dental canal for regenerative treatment of pulp and dentine, the drug enters deeply a dentinal tubule by the permeation effect of the nanobubble water, and the decontamination effect is prompted. This makes it possible to treat the infected root canal of the pulp safely in a short time.

Embodiments will be specifically described below.

First Embodiment

Figure 13:
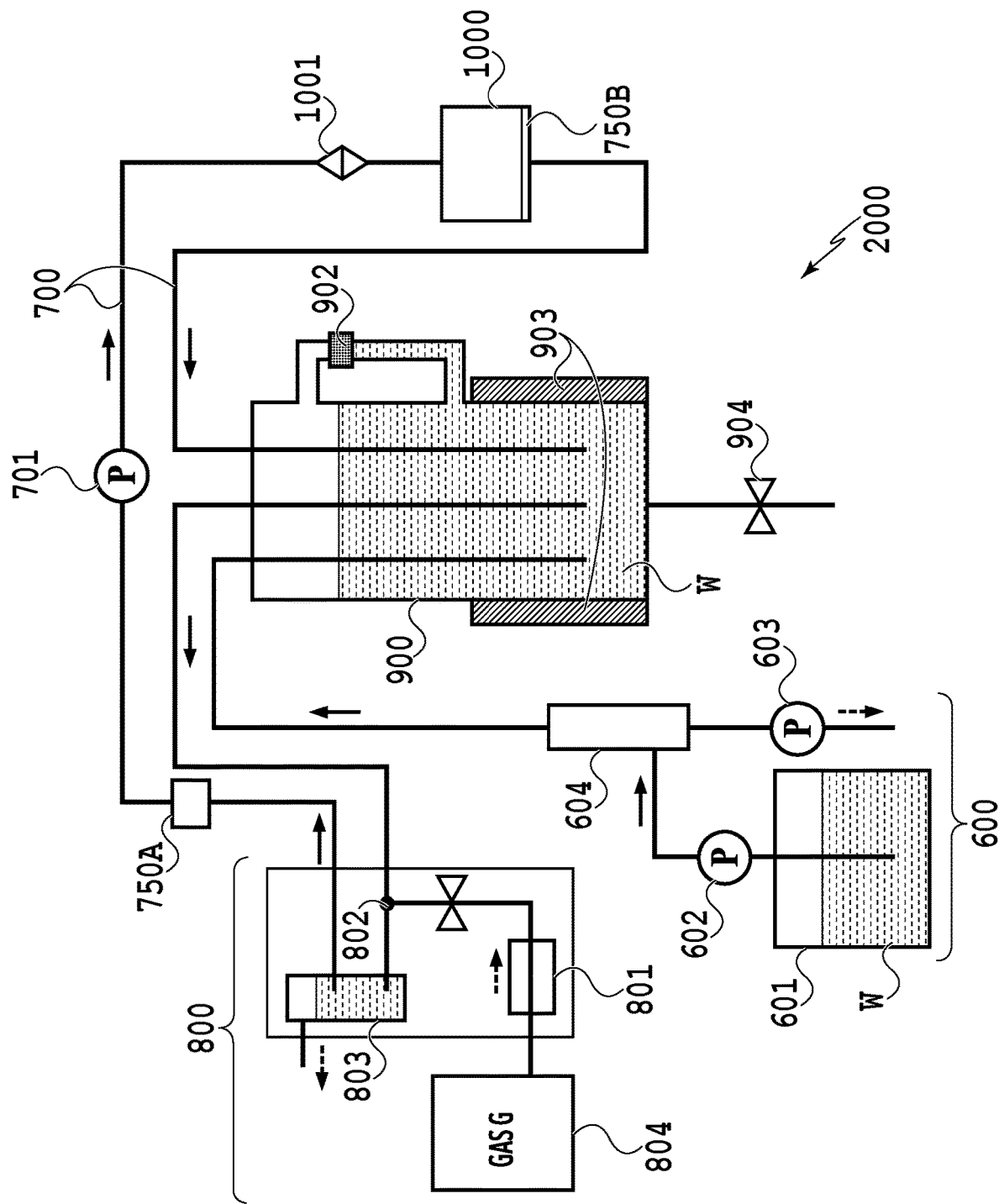
FIG. 13 is a schematic configuration diagram of a UFB-containing liquid producing apparatus.

FIG. 13 is a schematic configuration diagram of an ultrafine bubble-containing liquid producing apparatus 2000 in a first embodiment (hereinafter referred to as the UFB-containing liquid producing apparatus 2000). The UFB-containing liquid producing apparatus 2000 in the present embodiment mainly includes a liquid supplying unit 600, a gas dissolving unit 800, a core supplying unit 750 (750A, 750B), a first storing chamber 900, and an ultrafine bubble generating unit 1000 (hereinafter referred to as the UFB generating unit 1000). The liquid supplying unit 600, the gas dissolving unit 800, and the UFB generating unit 1000 correspond to the pre-processing unit 100, the dissolving unit 200, and the T-UFB generating unit 300 in FIG. 1, respectively. These units are connected to each other by a pipe 700, and a liquid W is circulated by a pump 701 disposed at an intermediate portion of the pipe 700. In FIG. 13, each solid arrow represents a liquid flow, and each dotted arrow represents a gas flow. Incidentally, although two core supplying units 750, namely the first core supplying unit 750A and the second core supplying unit 750B, are illustrated as the core supplying unit 750 in FIG. 13, it suffices that at least one of the core supplying units 750 is included. Note that in a case where the two core supplying units are not particularly distinguished from each other, they will be described simply as the core supplying unit 750.

The liquid supplying unit 600 mainly includes a liquid reservoir unit 601, two pumps 602 and 603, and a degassing unit 604. A liquid W reserved in the liquid reservoir unit 601 is transferred to the first storing chamber 900 by the pumps 602 and 603 via the degassing unit 604. Inside the degassing unit 604 is disposed a film through which gases can pass and liquids cannot pass. With pressures from the pumps 602 and 603, only gases pass through the film, so that the gases and the liquid are separated from each other. The liquid W is moved toward the first storing chamber 900 whereas the gases are discharged to the outside. Various gases may be dissolved in the liquid reserved in the liquid reservoir unit 601. By removing the dissolved gases at the degassing unit 604 before transferring the liquid to the first storing chamber 900, the efficiency of dissolution in a gas dissolving step to be subsequently performed can be enhanced.

The gas dissolving unit 800 includes a gas supplying unit 804, a pre-processing unit 801, a merging part 802, and a gas-liquid separating chamber 803. While the gas supplying unit 804 may be a gas cylinder storing a desired gas G, the gas supplying unit 804 may be an apparatus capable of continuously generating the desired gas G. For example, in a case where the desired gas G is oxygen, it is possible to employ an apparatus that takes in the atmospheric air, removes nitrogen, and feeds the gas from which nitrogen has been removed with a pump. Note that this gas dissolving unit 800 may incorporate a dissolution degree sensor not illustrated.

The gas G supplied by the gas supplying unit 804 is subjected to a process such as electrical discharging at the pre-processing unit 801. Then, at the merging part 802, the gas G merges with the liquid W having flowed out from the first storing chamber 900. Here, part of the gas G is dissolved into the liquid W. The gas G and the liquid W having thus merged are separated from each other again at the gas-liquid separating chamber 803, and the part of the gas G that has not been dissolved into the liquid W is discharged to the outside. The liquid W with the gas G dissolved therein is then transferred to the UFB generating unit 1000 via the first core supplying unit 750A by the pump 701. In the present embodiment, the pre-processing unit 801 performs a high-field process such as plasma discharge on oxygen $O_2$ supplied from the gas supplying unit 804. This brings the oxygen gas into an activated state, so that ozone $O_3$ is generated. The generated ozone is delivered to the merging part 802. As a result, at the gas dissolving unit 800, the ozone and water are mixed with each other, so that ozone water is produced and delivered to the first core supplying unit 750A as the liquid W.

The first core supplying unit 750A supplies a liquid in which a substance to be cores for the UFB generation is dissolved or dispersed to the UFB generating unit 1000. By generating UFBs in the UFB generating unit 1000 by using the liquid in which the substance to be cores for the UFB generation is dissolved or dispersed, a high-concentration UFB-containing liquid can be produced. Moreover, in the UFB-containing liquid being ozone water produced in the above manner, the ozone can last for a long time. In other words, a UFB-containing liquid with a longer ozone life can be provided. Details will be described later.

The UFB generating unit 1000 generates UFBs in the liquid W caused to flow into the UFB generating unit 1000. Various methods such as the Venturi method can be employed as the method of generating UFBs. In the present embodiment, the T-UFB method described using FIGS. 4 to 10B is employed. A filter 1001 is disposed upstream of the UFB generating unit 1000 and prevents impurities, dust, or the like from entering the UFB generating unit 1000. Removing impurities, dust, or the like can improve the UFB generation efficiency at the UFB generating unit 1000. On the other hand, this filter 1001 is set such that the substance to be cores for the UFB generation can pass through the filter 1001. The UFB-containing liquid W produced by the UFB generating unit 1000 is stored into the first storing chamber 900 through the pipe 700. The second core supplying unit 750B is included in the UFB generating unit 1000. Details will be described later.

The first storing chamber 900 stores the following mixed liquid. Specifically, the first storing chamber 900 stores a mixed liquid of the liquid W supplied from the liquid supplying unit 600, the liquid W in which the desired gas G has been dissolved at the gas dissolving unit 800 and the substance to be cores for the UFB generation has been dissolved or dispersed at the core supplying unit 750, and the UFB-containing liquid in which T-UFBs have been generated at the UFB generating unit 1000.

A liquid level sensor 902 is disposed at a predetermined height in the first storing chamber 900 and detects the surface of the liquid W. The configuration is such that, in the case where the liquid supplying unit 600 supplies a liquid W, the supply is stopped when the liquid surface reaches the liquid level sensor 902. A valve 904 is opened in a case of discharging the liquid W stored in the first storing chamber 900 to a container on the outside. The container on the outside may be, for example, the post-processing unit 400 or the collecting unit 500 in FIG. 1 or the post-processing unit 400 and the collecting unit 500. Note that, though not illustrated in FIG. 13, the first storing chamber 900 may be provided with an agitator therein for making the temperature of and the UFB distribution in the liquid W uniform. The first storing chamber 900 may also be provided with a UFB concentration sensor that detects the UFB concentration of the liquid W stored therein.

A cooling unit 903 cools the liquid W stored in the first storing chamber 900. It is preferable that the temperature of the liquid W to be supplied to the gas dissolving unit 800 be as low as possible in order to efficiently dissolve the desired gas G at the gas dissolving unit 800. Also, keeping the liquid W to be circulated at low temperature suppresses rise in the temperature of the UFB generating unit 1000, which generates UFBs by utilizing film boiling. This can lengthen the life of the UFB generating unit 1000. In the present embodiment, a temperature sensor is provided inside the first storing chamber 900, and the temperature of the liquid W to be supplied to the gas dissolving unit 800 is adjusted at 10° C. or lower by using the cooling unit 903 while the temperature of the liquid is detected.

The configuration of the cooling unit 903 is not particularly limited. For example, it is possible to employ a type which uses a Peltier device or a type which circulates a liquid cooled by a chiller. In the case of the latter, a cooling tube through which a cooling liquid is circulated may be wound around the outer periphery of the first storing chamber 900 as in FIG. 13, or the first storing chamber 900 may be formed to have a hollow structure with a cooling tube disposed in the hollow space. Alternatively, the configuration may be such that a cooling tube is immersed in the liquid W inside the first storing chamber 900.

In the present embodiment, the above configuration forms a circulation route for a liquid W that starts from the first storing chamber 900, passes through the gas dissolving unit 800, the core supplying units 750, and the UFB generating unit 1000, and returns to the first storing chamber 900.

In FIG. 13, the pump 701, which urges a liquid W to be circulated through the entire circulation route, is disposed between the gas dissolving unit 800 and the UFB generating unit 1000. However, the position and the number of pumps are not limited to this case. For example, a pump may be disposed between the UFB generating unit 1000 and the first storing chamber 900, or a pump may be disposed between the gas dissolving unit 800 and the UFB generating unit 1000 and also between the UFB generating unit 1000 and the first storing chamber 900. Further, in each unit's configuration, a pump or a valve that may be necessary in the unit's operation may be provided. A pump whose pulsation and flow rate variation are small is preferably used to avoid impairing the UFB generation efficiency.

Also, the collection route and the valve 904 for collecting a liquid W may be provided not at the first storing chamber 900 but at another position in the liquid circulation route. Further, in a case where the temperature of the UFB generating unit 1000 rises intensely, the UFB generating unit 1000 may also be provided with a cooling unit similar to that of the first storing chamber 900.

The dissolution degree sensor, the temperature sensor, and the UFB concentration sensor may be provided at any positions as long as they are within the circulation route. Alternatively, the configuration may be such that each sensor is provided at a plurality of positions in the circulation route and an average value can be outputted.

Members that contact the UFB-containing liquid, such as the liquid contacting portions of the pipe 700, the pump 701, the filter 1001, the first storing chamber 900, and the UFB generating unit 1000, are preferably made of a material with high corrosion resistance. For example, a fluorine-based resin such as polytetrafluoroethylene (PTFE) or perfluoroalkoxy alkane (PFA), a metal such as SUS316L, or another inorganic material can be preferably used. In this way, it is possible to generate UFBs in a suitable manner even in a case of using a highly corrosive gas G and liquid W.

<<Description of Generation of UFBs Using Substance to be Cores>>

Next, a description will be given of an example of generating UFBs at a high concentration by using a liquid W in which a substance to be cores for the UFB generation supplied by the core supplying unit 750 (hereinafter also referred to simply as "cores") is dissolved or dispersed. The description will be given below by taking the first core supplying unit 750A as an example.

As described earlier, ozone water is supplied to the first core supplying unit 750A. With the ozone water, which is highly reactive, the cores for the UFB generation are dissolved into the liquid W, for example, on the molecular level at the first core supplying unit 750A. In this example, the cores for the UFB generation are part of the substance in the circulation route for the UFB generation that contacts the liquid W (channel wall), such for example as the first core supplying unit 750A, the pipe 700, and the first storing chamber 900. With the cores for the UFB generation dissolved or dispersed in the liquid W, UFBs can be generated at a high concentration. This is because, in the generation of bubbles, bubbles can generally be generated with less energy in a case where the bubbles are generated under the presence of cores than in a case where the bubbles are generated under the presence of no core. Accordingly, a larger number of UFBs can be generated in the case where cores for the UFB generation are dissolved or dispersed than in the case where no core is present. In particular, it is more desirable if the substance to be cores is a hydrophobic substance with affinity for gases. An example of the UFB size is 10 to 100 nm, as mentioned earlier, and is 100 to 200 nm in the present embodiment, for example. Advantageously, the substance to be cores for the UFB generation has a size smaller than or equal to the UFB and dispersed in the liquid. Thus, advantageously, in the present embodiment, the cores for the UFB generation have a size of, e.g., 100 to 200 nm or less, and are dispersed in the liquid.

The liquid W is delivered to the UFB generating unit 1000 with the cores for the UFB generation dissolved or dispersed therein by the first core supplying unit 750A. In the UFB generating unit 1000, film boiling bubbles 13 are generated as described in FIGS. 7A to 11B, for example, to generate UFBs 11 at a high concentration on the UFB cores. The present inventors have found that generating UFBs by generating film boiling bubbles 13 in the UFB generating unit 1000 under the presence of the substance to be cores enables generation of a larger number of UFBs than in conventional methods. Specifically, the present inventors have found that a liquid containing one billion UFBs/ml is produced. Note that basically a single UFB can be generated on a single core but this UFB-containing liquid can also contain UFBs generated without a core. The present inventors have also found that this UFB-containing liquid (ozone water) has a longer ozone life. In normal ozone water, the life of the ozone is only about tens of minutes. That is, in ozone water with ozone dissolved therein, the ozone disappears normally in about tens of minutes. In contrast, the present inventors have found that the UFB-containing liquid (ozone water) produced in the above manner contains a high concentration of ozone even after elapse of three days.

In methods other than the method described in the present embodiment, in which UFBs are generated utilizing film boiling, e.g., UFB generating methods such as the Venturi method, bubbles with large buoyancy and volumes such as microbubbles and milli-bubbles are generated simultaneously with the UFB generation. If microbubbles, milli-bubbles, and the like are generated, cores that are considered effective in generating UFBs (mainly hydrophobic substance or the like) are adsorbed by these bubbles and prevented from being dispersed. For this reason, it is difficult to efficiently generate a high concentration of UFBs with UFB generating methods such as the Venturi method. In contrast, with the UFB generating method with film boiling used in the present embodiment, UFBs are generated in the course of the process from the local pressure generation in micrometer-size film boiling bubbles to the disappearance of the bubbles. This mechanism can generate UFBs with substantially no large bubbles such as millimeter-size bubbles and larger bubbles generated. Thus, a high concentration of UFBs can be generated by the combination in the embodiment of the UFB generating method utilizing film boiling and the solution or dispersion in which the substance to be cores for the UFB generation are dissolved or dispersed.

Meanwhile, in the description so far, an example has been described in which oxygen is subjected to a high voltage to be a plasma and dissolved into a liquid to thereby produce ozone, which is a radial substance, and the ozone water is brought into contact with the substance to be cores (e.g., part of the channel wall that contacts the liquid) to thereby dissolve the cores for the UFB generation on the molecular level. However, method is not limited to this example. An example has been described in which the core supplying unit 750 is disposed at an intermediate portion of the circulation route from the gas dissolving unit 800 to the UFB generating unit 1000. However, the core supplying unit 750 may be included in the UFB generating unit 1000. Specifically, cores may be dissolved by the second core supplying unit 750B in the UFB generating unit 1000.

An example of the second core supplying unit 750B included in the UFB generating unit 1000 will be described. As described earlier, the core supplying unit 750 supplies a substance to be cores for the UFB generation to the UFB generating unit 1000. Here, a substance to be cores for the UFB generation can be dissolved into the liquid W during the generation of UFBs in the UFB generating unit 1000. Specifically, a solid present at the top layer or the like of the heating element 10 (also referred to as "heat generation member") can be heated by the heating element 10 to be separated as a substance to be cores, and this substance to be cores can be dissolved into the liquid. For example, as film boiling is caused in the liquid W, a pressure is abruptly generated when a film boiling bubble is generated and when it disappears, as described earlier. By this pressure, the substance at the top layer or the like of the heating element 10 flakes off on the molecular level and is dissolved into the liquid. Thus, the core supplying unit 750 may be included in the UFB generating unit 1000 itself.

Also, in the present embodiment, an example in which the first core supplying unit 750A is disposed in the circulation route for generating UFBs has been described. However, the first core supplying unit 750A does not necessarily have to be disposed in the circulation route. The above system may be supplied with a solution in which UFB cores have been dissolved by another system, and this solution may be mixed in the circulation route.

<<Example of Supplying Cores Inside UFB Generating Unit 1000>>

Next, a description will be given of an example of supplying cores for the UFB generation inside the UFB generating unit 1000 and generating UFBs on these cores. Note that cores may be supplied from the first core supplying unit 750A or supplied from the second core supplying unit 750B. In the UFB generating unit 1000, film boiling bubbles 13 are generated in the liquid, as described in FIGS. 7A to 11B, for example. With these film boiling bubbles 13, UFBs 11 are generated on the UFB cores to thereby produce a high-concentration UFB-containing liquid. An example of generating UFBs will be described below using FIGS. 14A to 15D.

Figure 14A:
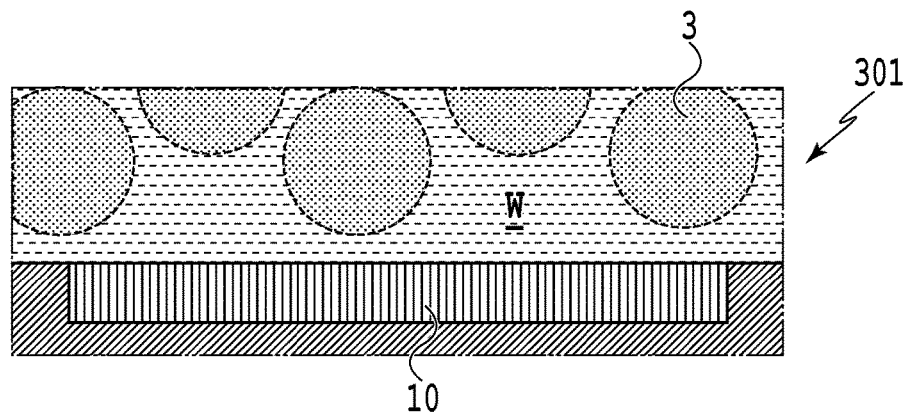
FIGS. 14A to 14D are enlarged views of a region around a heating element in a UFB generating unit.

FIGS. 14A to 15D are enlarged views of a region around the heating element 10 in the UFB generating unit 1000 described in FIGS. 7A to 11B, for example. FIG. 14A illustrates the state before the application of a voltage pulse to the heating element 10. The liquid W in which the gas-dissolved liquid 3 is mixed flows inside the chamber 301. Incidentally, illustration of the protective layer 309 and the cavitation-resistant film 310 for protecting the heating element is omitted in FIGS. 14A to 14D.

Figure 14B:
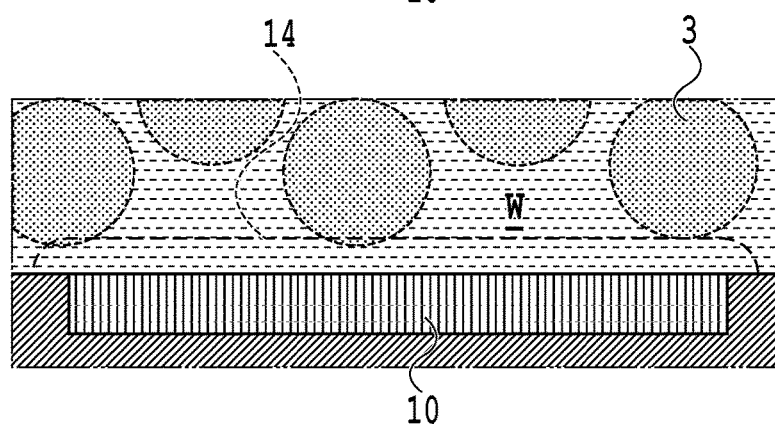

FIG. 14B illustrates the state where the heating element 10 is caused to generate heat. The heating element 10 and the liquid W (containing the gas-dissolved liquid 3) are heated from the contact surface of the heating element 10 so that their temperature rises and a not-yet-bubbling high temperature region 14 is formed. Incidentally, the dotted line in FIG. 14B is illustrated for convenience as a contour line indicating a predetermined temperature in a distribution of heat dropping from high temperature to normal temperature.

Figure 14C:
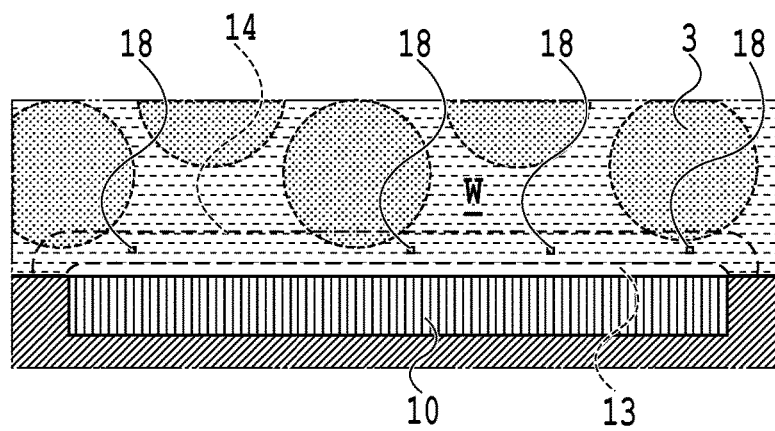

FIG. 14C illustrates the state where the liquid W in a portion of the high-temperature region around the contact surface between the heating element 10 of the element substrate 12 and the liquid W where the temperature has reached 300° C. has generated a film boiling bubble 13. The film boiling bubble 13 is a bubble that is formed at once on the surface of the heating element 10 (excluding the portion of the region around the heating element where the temperature has not reached 300° C.), and is an extremely thin film-shaped bubble having a thickness of 1 μm or less at the beginning of the formation. Also, as described in FIGS. 6A and 6B, this bubble has an extremely high pressure as high as 100 atmospheres and appears in an extremely short time, and therefore applies a thermal and pressure impact to the region around it. This thermal and pressure impact exerts a chemical, electrical, mechanical, or physical effect on the heating element surface. This melts, ionizes, or breaks part of the substance at the surface of the heating element 10 or cuts the bond between molecules or atoms in the part of the surface substance, and thereby detaches the part of the substance in the form of a microscopic substance 18. This microscopic substance 18 is one substance to be cores for the UFB generation. Specifically, the second core supplying unit 750B in the UFB generating unit 1000 is associated with the element substrate 12. Here, the microscopic substance 18 refers to an extremely small substance and specifically refers to a substance with a size of 100 nm or less. Incidentally, there can be a case where film boiling is repeatedly caused to lower the bond strength and detach a large surface substance with a size of 1 μm or more. A surface substance of this size does not float so much in the liquid and sinks with its own weight. Such a surface substance with a size of 1 μm or more is not included in the types that have a size of 100 nm or less and a small weight and float in the liquid, such as the microscopic substance 18 in the present embodiment.

Figure 14D:
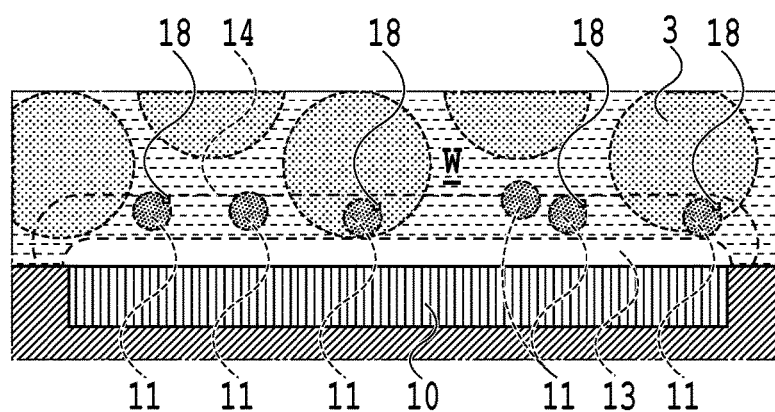

FIG. 14D represents the period in which the film boiling bubble 13 grows, illustrating the state where the film boiling bubble 13 grows further and UFBs 11 are generated by a thermal and pressure effect on the not-yet-bubbling high temperature region 14 around the film boiling bubble 13. In the not-yet-bubbling high temperature region 14, bubbles are not thermally generated, but the temperature instantaneously reaches as high as 200° C., thereby lowering the saturation solubility. Thus, the gas dissolved in the liquid W and the gas-dissolved liquid 3 is precipitated and becomes UFBs 11. There are also UFBs 11 generated by the precipitation of the dissolved gas caused by the pressurization by the film boiling bubble 13, and UFBs 11 generated by the precipitation of the dissolved gas caused by the decrease in saturation solubility occurring in response to the pressure in the film boiling bubble 13 becoming a low pressure near a vacuum in the course of expansion of the film boiling bubble 13 by inertial force.

Under this environment, the presence of the microscopic substance 18 triggers the precipitation of the dissolved gas in some cases. This is because, as compared to a uniform state in which no substance is present, the microscopic substance 18 causes nonuniformity that disturbs uniformity. With the microscopic substance 18, the gas can be precipitated even at the beginning of the decrease in saturation solubility, at which the precipitation energy is low. In other words, the volume of precipitation is small. Accordingly, smaller UFBs 11 can be generated. Incidentally, in this state too, there are UFBs 11 generated without the microscopic substance 18 as bases, as illustrated in FIG. 14D, but the number of these UFBs 11 tends to be small.

Figure 15A:
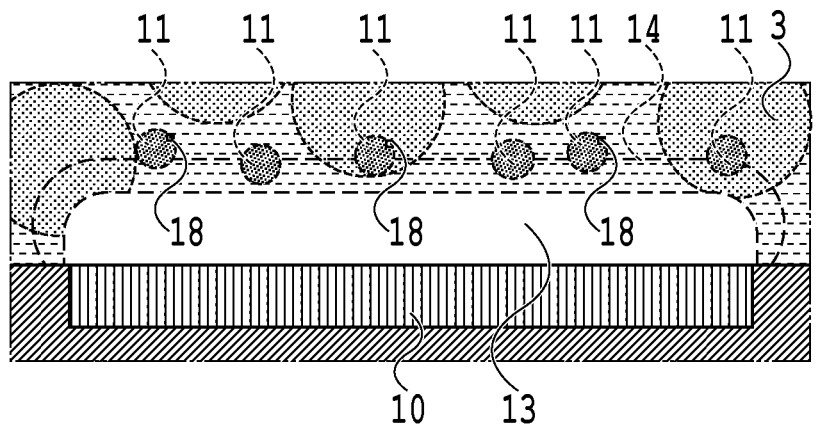
FIGS. 15A to 15D are enlarged views of the region around the heating element in the UFB generating unit.
Figure 15B:
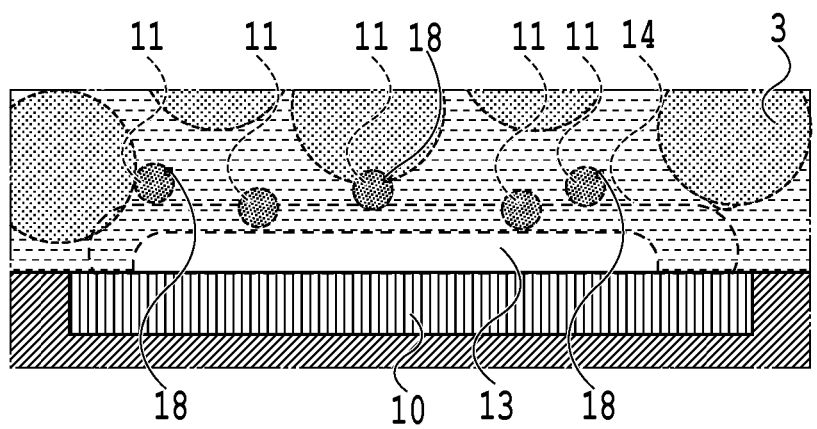
Figure 15C:
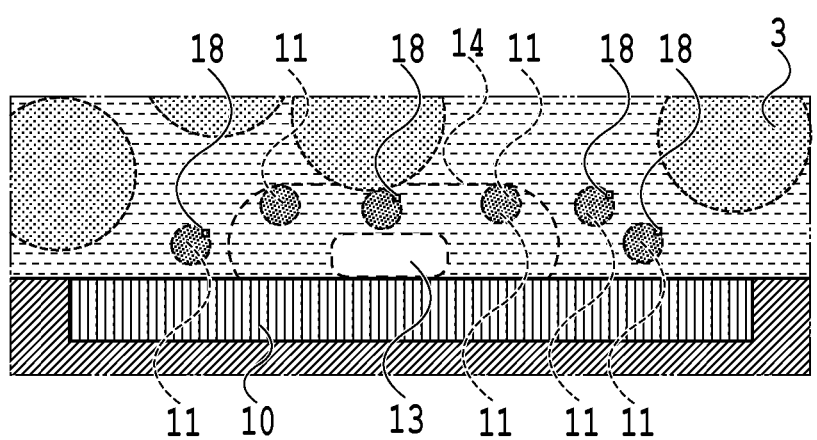
Figure 15D:
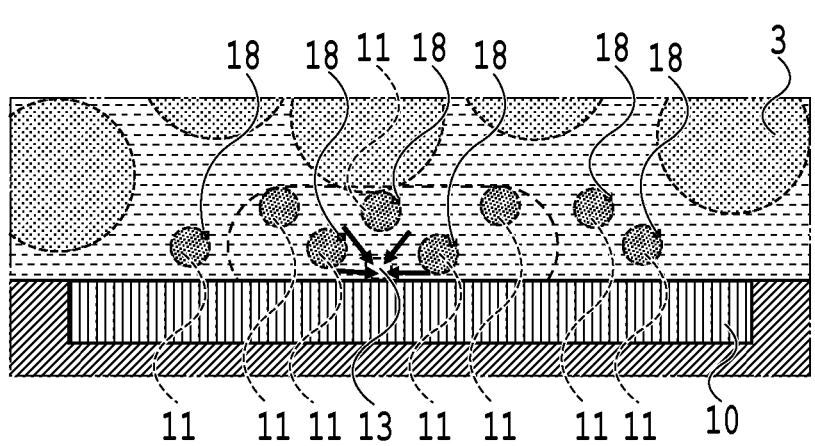

FIG. 15A illustrates a maximum film boiling volume state in which the inertial force in the direction of expansion of the film boiling bubble 13 to the surrounding liquid and the force in the direction of shrinkage generated by the vacuum state inside the film boiling bubble 13 are balanced, thereby stopping the growth of the film boiling bubble 13. FIGS. 15B and 15C illustrate the states where the shrinking force on the film boiling bubble 13 is stronger, thereby shrinking the film boiling bubble 13. The film boiling bubble 13 has shrunk to a small size and is immediately before disappearing. FIG. 15D illustrates the moment at which the film boiling bubble 13 disappears. At this moment, the liquid collides with itself, so that a strong shock wave is generated by the cavitation. At this moment too, the microscopic substance 18 is detached and UFBs 11 are generated with the microscopic substance 18 as bases. As described above, the thermal and pressure impacts applied when the film boiling bubble 13 is generated and when it disappears detach part of the surface substance in the form of the microscopic substance 18. The detached microscopic substance 18 can then be cores for the UFB generation in the generation of UFBs 11 described in FIGS. 7A to 11B.

Figure 16A:
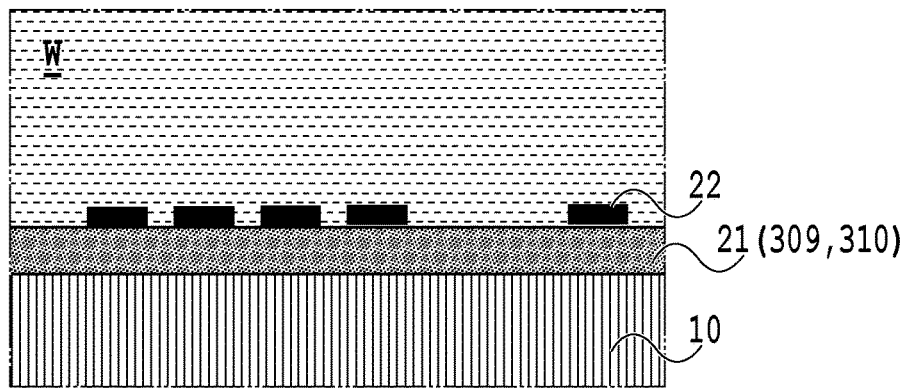
FIGS. 16A to 16D are diagrams describing a second core supplying unit.

FIGS. 16A to 16D are diagrams schematically illustrating the states of generation of UFBs described in FIGS. 14A to 15C, and are enlarged views of a region around the heating element 10. In other words, FIGS. 16A to 16D are diagrams describing the second core supplying unit 750B. In FIG. 16A, a protective film 21 present between the heating element 10 and the liquid Win contact with it is illustrated (not illustrated in FIGS. 14A to 15D). The protective film 21 has a function of electrically protecting the heating element 10 from the liquid and a function of protecting the heating element 10 from the thermal and pressure impacts by the cavitation and the like. Specifically, the protective film 21 includes at least one of the protective layer 309 and the cavitation-resistant film 310 described in FIGS. 5A and 5B. A surface (liquid contact surface) of the protective film 21 has kogations (burnt deposits) 22 attached thereto. The kogations 22 are substances among the components of the liquid that get deteriorated or burnt by heat. The kogations 22 accumulate on the surface of the protective film 21 as a result of repetitively generating a film boiling bubble 13 with the heating element 10.

Figure 16B:
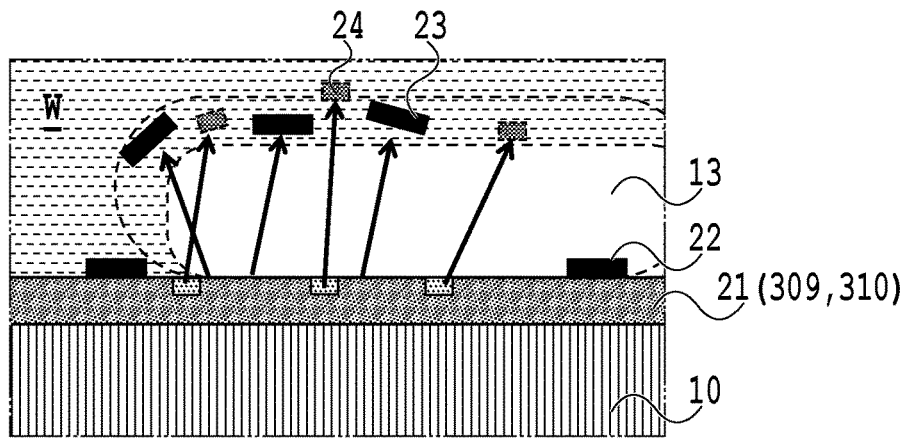

FIG. 16B illustrates the state where the liquid W in a portion of the high-temperature region around the contact surface between the protective film 21 on the heating element 10 and the liquid W where the temperature has reached 300° C. has generated a film boiling bubble 13. As described earlier, this film boiling bubble 13 applies a thermal and pressure impact to a region around it. This thermal and pressure impact exerts a chemical, electrical, mechanical, or physical effect on the heating element surface (protective film 21). This melts, ionizes, or breaks some 23 of the kogations 22, which are substances attached to the surface, or cuts the bond between molecules or atoms in the some kogations 23, and thereby detaches the some kogations 23 in the form of a microscopic substance 18. The above also melts, ionizes, or breaks part 24 of the constituent substance of the protective film 21 or cuts the bond between molecules or atoms in the part 24 of the substance, and thereby detaches the part 24 of the substance in the form of a microscopic substance 18. Examples of the constituent substance of the protective film 21 (protective layer 309 and cavitation-resistant film 310) is as described earlier. In the present embodiment, the protective layer 309 is made of a compound containing Si. The compound may be, for example, SiN, SiO, SiC, SiON, or SiOC. The cavitation-resistant film 310 is made of a high melting point metal having a melting point of 1770° C. or higher and can be made of, for example, one of Hf, Ta, W, Nb, Ir, and Pt, or an alloy or oxide containing at least one of Hf, Ta, W, Nb, Ir, and Pt.

Figure 16C:
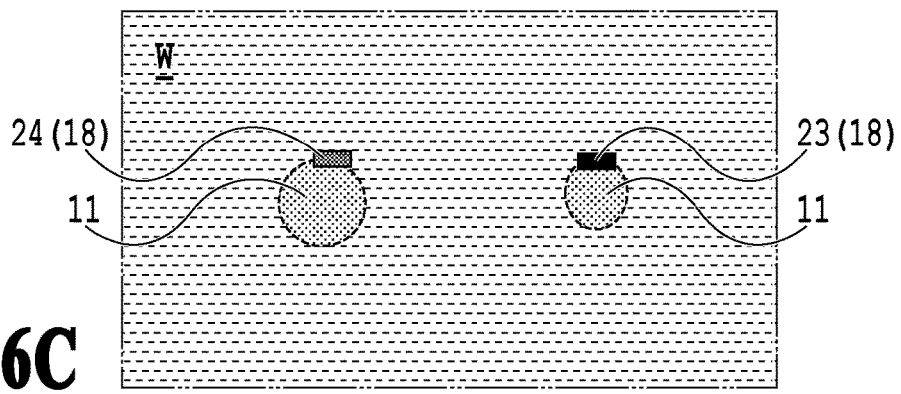

FIG. 16C illustrates the state where UFBs 11 are generated with the detached microscopic substances 18 as bases. The interfaces between the microscopic substances originating from the kogations 22 and the protective film 21, which forms a part of the element substrate 12, and the liquid W may have a chemically, electrically, physically, or mechanically nonuniform state such as turbulence of surface energy and concentration of electrical energy at sharp tips. This, in other words, creates a condition that makes it easier to generate UFBs 11. In a case where the thermal and pressure effect of the film boiling bubble 13 is exerted in this state, UFBs 11 will be easily generated with the some detached kogations 23, which were substances attached to the surface, and the detached part 24 of the substance of the protective film as bases.

Figure 16D:
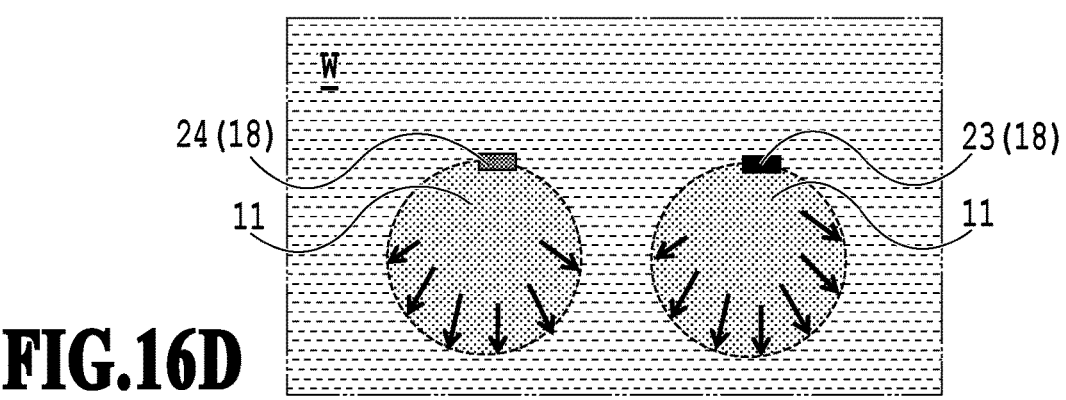

FIG. 16D illustrates the state where the UFBs 11 have been generated and grown with the some detached kogations 23, which were substances attached to the surface, and the detached part 24 of the substance of the protective film as bases. The UFBs 11 are bubbles precipitated as a result of exceeding the saturation solubility. In a case of generating the UFBs 11 without a base, a vast amount of energy is required to change from the state of absence to a state of presence. Thus, even after the ultrafine bubbles are generated, the remaining energy causes the bubbles to grow to a size of 100 nm or larger. In contrast, in the case where the microscopic substances 18 are present, the ultrafine bubbles are generated with a relatively low amount of energy and accordingly the remaining energy is relatively small. This enables the bubbles to remain as ultrafine bubbles. The above is a description of the second core supplying unit 750B disposed in the UFB generating unit 1000. In other words, the above is an example of supplying substances to be cores inside the UFB generating unit 1000.

As described above, in this example, the microscopic substances originating from some of the kogations 22 and the protective film 21, which forms a part of the element substrate 12, part of the substance dissolved by ozone, etc. are described as examples of the substances to be cores for the UFB generation. However, the substances to be cores for the UFB generation are not limited to these. It suffices that the liquid W contains at least one kind of substance to be cores for the UFB generation. Specifically, it suffices that the liquid W contains a substance having a solubility parameter (SP) value different from that of the liquid W. In a case where a substance with a degree of polarity different from that of the liquid W is contained, the substance to be cores is detached easily.

<<Description of First Core Supplying Unit 750A>>

Next, details and a modification of the first core supplying unit 750A will be described. The first core supplying unit 750A in the present embodiment is configured to supply a liquid in which a substance to be cores for the UFB generation are dissolved to the UFB generating unit 1000. In the present embodiment, the first core supplying unit 750A is a part of the pipe 700 through which the ozone water produced at the gas dissolving unit 800 passes toward the UFB generating unit 1000.

Figure 17:
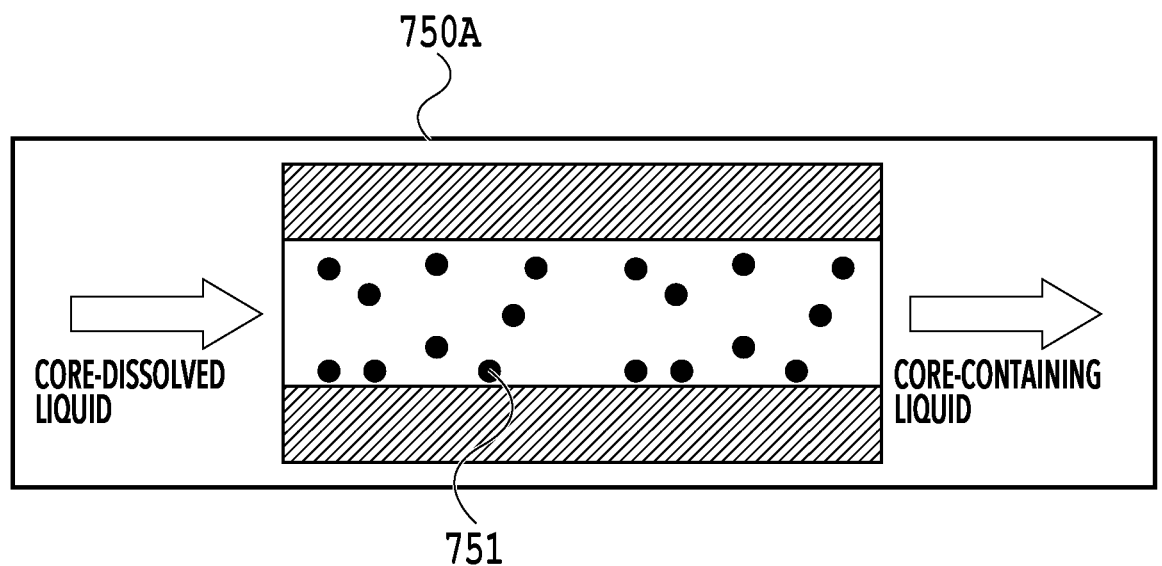
FIG. 17 is a conceptual diagram illustrating a configuration of a first core supplying unit.

FIG. 17 is a conceptual diagram illustrating a configuration of the first core supplying unit 750A. It illustrates an example of supplying the liquid W in which cores 751 are dissolved as a liquid containing the cores 751 to the UFB generating unit 1000.

Figure 18:
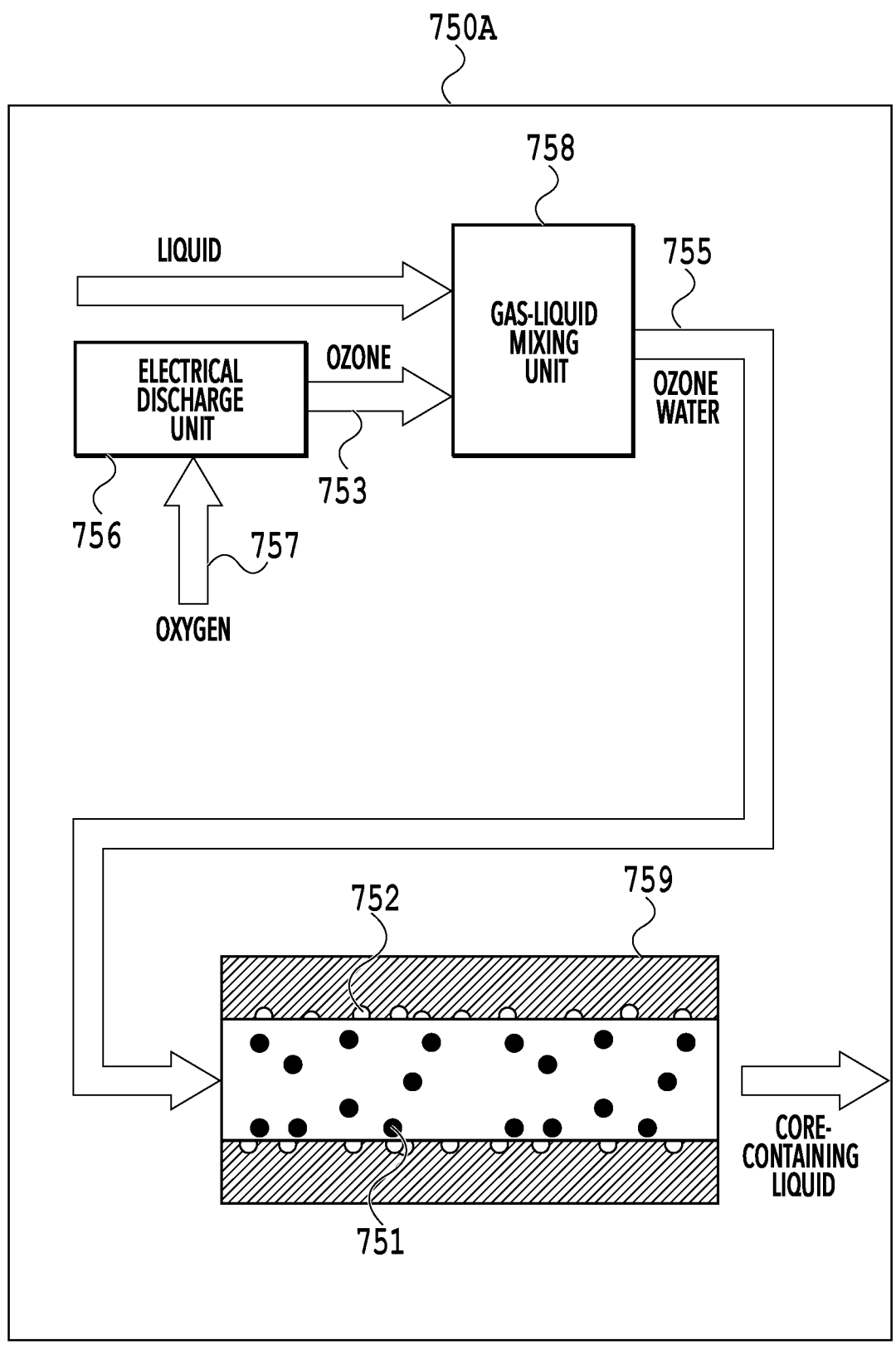
FIG. 18 is a conceptual diagram illustrating a configuration of the first core supplying unit.

FIG. 18 illustrates the first core supplying unit 750A as a system that generates the cores 751 by utilizing ozone water 755 and supplies a core-containing liquid. Incidentally, FIG. 18 illustrates an example in which the first core supplying unit 750A includes an electrical discharge unit 756 and a gas-liquid mixing unit 758. Alternatively, the first core supplying unit 750A may have the configuration of the gas dissolving unit 800 as illustrated in FIG. 13. Oxygen 757 is supplied to the electrical discharge unit 756 and a corona discharge is generated in the electrical discharge unit 756 to make the oxygen 757 produce ozone 753. By mixing the ozone 753 into a liquid in the gas-liquid mixing unit 758, the ozone water 755 is produced. The ozone water 755 is supplied to a core-containing liquid producing unit 759. In the core-containing liquid producing unit 759, the cores 751 are generated from part 752 of a channel wall, and a core-containing liquid being a liquid containing the cores 751 is delivered.

Figure 19A:
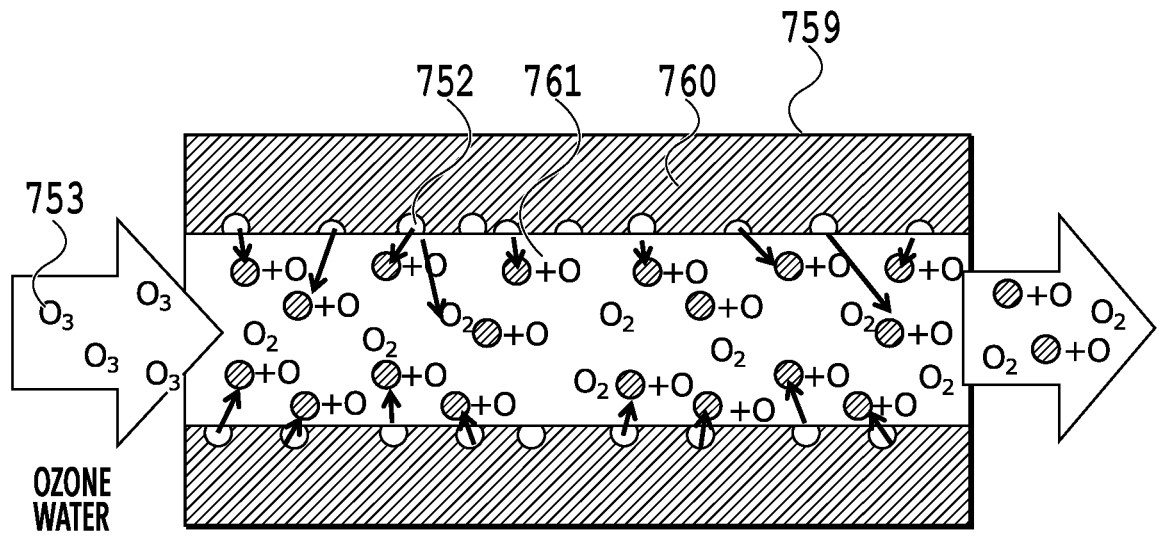
FIGS. 19A and 19B are diagrams describing a mechanism of how cores are generated.
Figure 19B:
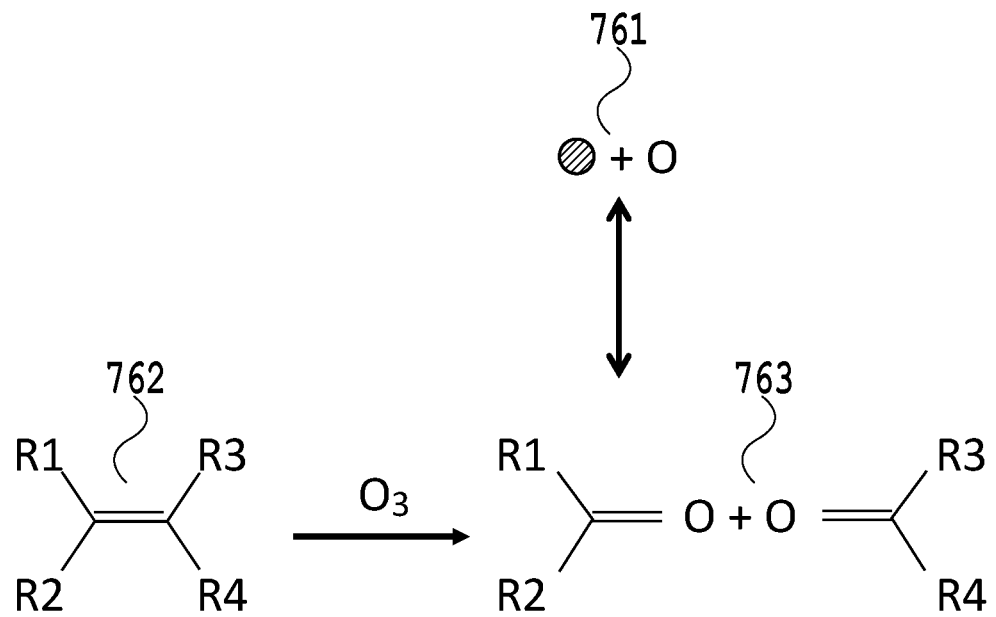

FIGS. 19A and 19B are diagrams describing the mechanism of how the cores 751 are generated in the first core supplying unit 750A. FIG. 19A is a diagram schematically illustrating the inside of the core-containing liquid producing unit 759. The ozone water 755 containing the ozone 753 flows through the core-containing liquid producing unit 759. As the ozone water 755 flows through the core-containing liquid producing unit 759, the ozone water 755 oxidizes the part 752 of a channel wall 760, so that oxidized cores 761 (wall material+O) are generated and detached from the channel wall 760. As a result, a core-containing liquid containing the oxidized cores 761 is produced and supplied to the UFB generating unit 1000. FIG. 19B is a diagram describing the mechanism of generating the oxidized cores 761 more specifically. The channel wall 760 is made of an organic polymer body 762 having an R1-R2-R3-R4 structure. As the ozone 753, which is $O_3$, contacts this organic polymer body 762, an organic synthetic reaction occurs, so that an ozone oxide 763 having a five-membered ring structure is produced. As the ozone oxide 763 is produced, organic degradation occurs and the ozone oxide 763 is broken by ozone cracking, in which cracks are formed. As a result, oxidized cores 761 are detached from the channel wall. Since this is a reaction that occurs on the molecular level, the reaction works advantageously with a microscopic substance 18 with a size of several nm to 100 nm as a microscopic substance to be cores for the UFB generation.

Note that it is possible to use an inorganic material, a metal, or the like as the material of the channel wall 760 besides an organic material, and produce an oxide with different properties corresponding to the material. For example, phosphorus, nitrogen, or the like can be utilized as a nutritional component effective in culturing food. In the case of a metal, a metal oxide can be utilized as an oxygen supplementation material using a redox reaction.

Figure 20:
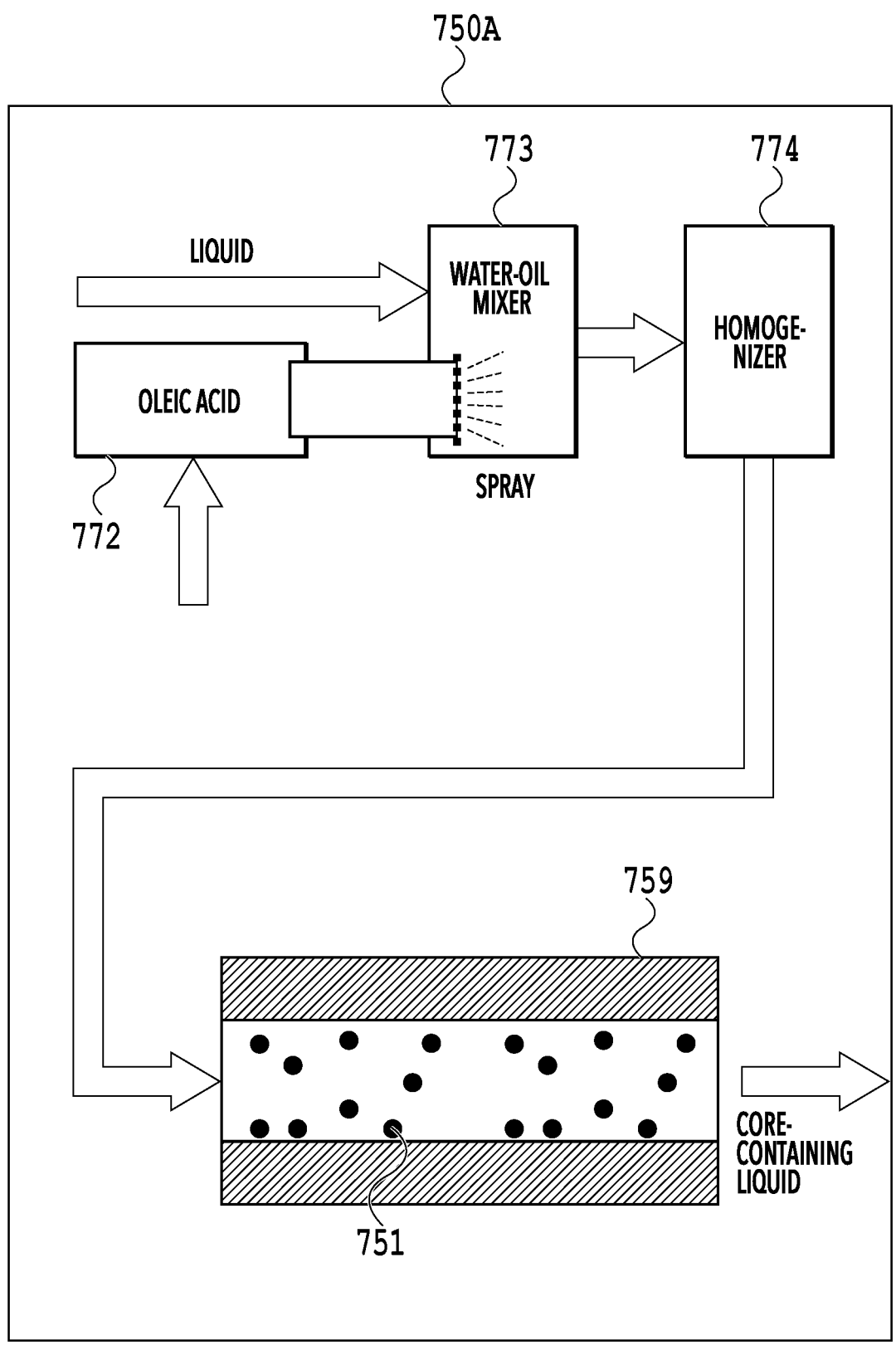
FIG. 20 is a conceptual diagram illustrating a configuration of the first core supplying unit.

FIG. 20 is a diagram describing another example of the first core supplying unit 750A. FIG. 20 illustrates a method of producing a core-containing liquid containing an oil/fat component as its core component. Firstly, oleic acid 772 is discharged in the form of a spray from pores into a water-oil mixer 773 and mixed into a liquid. As a result, a microscopic oleic acid mixed liquid is produced as a liquid containing water as a main component. Further, the microscopic oleic acid mixed liquid is subjected to an ultrasonic vibration or a rotational flow using a homogenizer 774, a vortex mixer, or the like to generate finer oleic acid cores. As a result, a liquid containing cores 751 of a microscopic substance is produced. It is possible to use an organic material, an inorganic material, a metallic material, or the like as the substance to be mixed besides an oil/fat component. The first core supplying unit 750A in FIG. 20 may be used as the first core supplying unit 750A in FIG. 13 or disposed in the circulation route as another first core supplying unit other than the first core supplying unit 750A in FIG. 13.

Also, a description has been given of an example in which the first core supplying units 750A described in FIGS. 17 to 20 are disposed in the circulation route illustrated in FIG. 13. However, the configuration is not limited to this example. These first core supplying units 750A may be incorporated in another system for producing a core-containing liquid and provide the core-containing liquid to a system as illustrated in FIGS. 1 and 13.

<Block Diagram and UFB Producing Method>

Next, a configuration of the UFB-containing liquid producing apparatus 2000 and a UFB producing method will be described.

Figure 21:
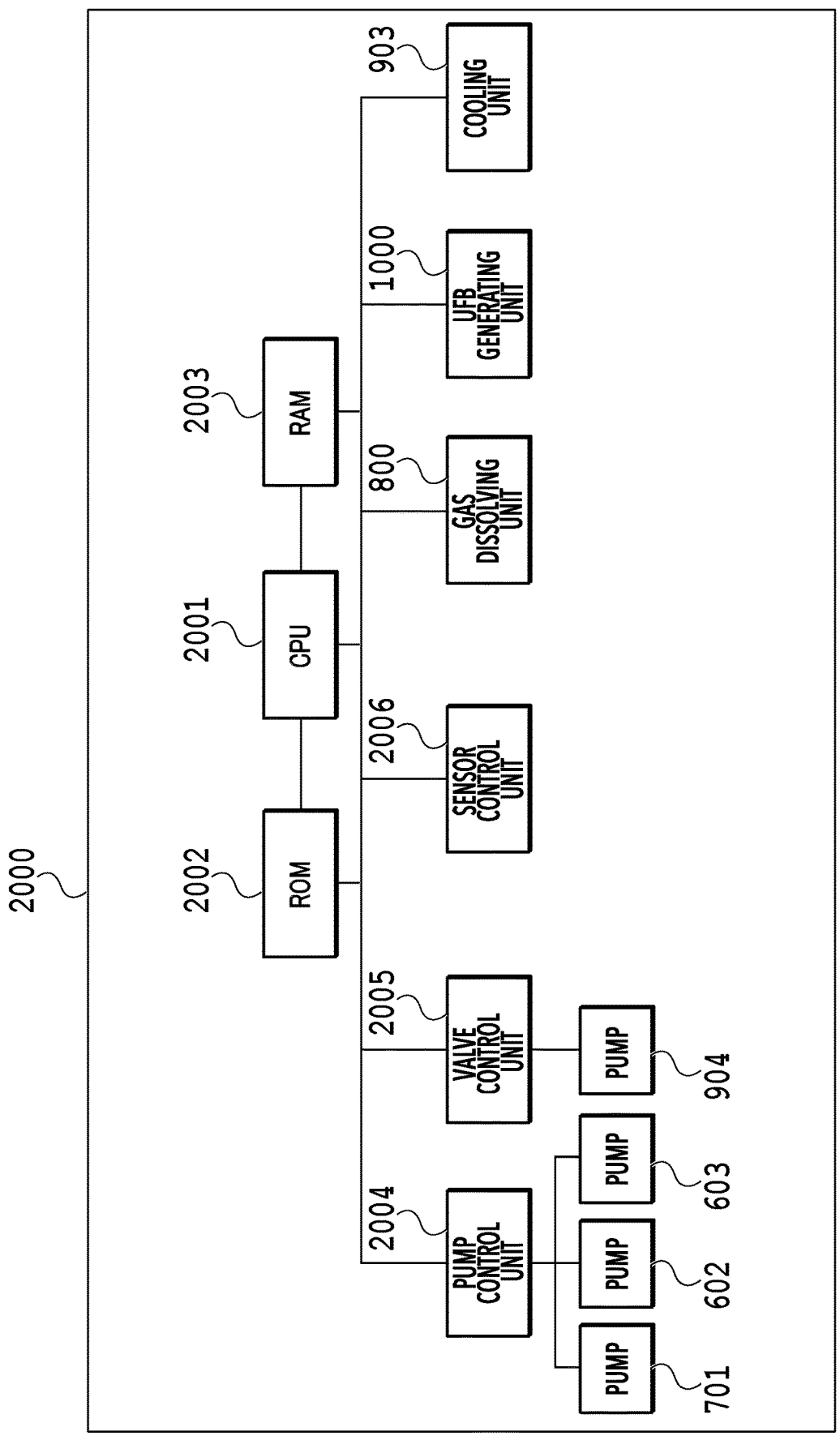
FIG. 21 is a block diagram describing a control configuration in the UFB-containing liquid producing apparatus.

FIG. 21 is a block diagram for describing a control configuration in the UFB-containing liquid producing apparatus 2000 in the present embodiment. A CPU 2001 controls the entire apparatus while using a RAM 2003 as a work area in accordance with a program stored in a ROM 2002.

Under the instruction of the CPU 2001, a pump control unit 2004 controls the driving of various pumps provided in the circulation route illustrated in FIG. 13, including the pumps 602, 603, and 701. Under the instruction of the CPU 2001, a valve control unit 2005 controls the opening and closing of various valves including the valve 904. Under the instruction of the CPU 2001, a sensor control unit 2006 controls various sensors including the dissolution degree sensor, the temperature sensor, and the UFB concentration sensor as well as the liquid level sensor 902 and provides the detection values of the various sensors to the CPU 2001.

For example, in a case where the UFB-containing liquid producing apparatus 2000 starts operating, the CPU 2001 drives the pumps 602 and 603 until the liquid level sensor 902 detects a liquid surface to reserve a predetermined amount of a liquid in the first storing chamber 900. Also, in a case where the UFB concentration detected by the UFB concentration sensor reaches a predetermined value, the CPU 2001 causes the pump control unit 2004 to stop operating the pump 701, and causes the valve control unit 2005 to open the valve 904, thereby discharging the liquid W stored in the first storing chamber 900.

Next, an example of the UFB-containing liquid producing method will be described. The CPU 2001 firstly reserves a predetermined amount of a liquid in the first storing chamber 900 (S01). Specifically, the CPU 2001 causes the pumps 602 and 603 to operate while monitoring the detection by the liquid level sensor 902. Thus, a liquid W reserved in the liquid supplying unit 600 is degassed at the degassing unit 604 and transferred to the first storing chamber 900. Then, in a case where the liquid level sensor 902 detects a liquid surface, the CPU 2001 causes the pumps 602 and 603 to stop operating. As a result, a predetermined amount of a liquid W is reserved in the first storing chamber 900.

The CPU 2001 then starts adjusting the temperature of the liquid W stored in the first storing chamber 900 (S02). Specifically, the CPU 2001 causes the cooling unit 903 to operate while monitoring the temperature detected by the temperature sensor. The CPU 2001 proceeds to the next control if the temperature detected by the temperature sensor reaches 10° C. or lower.

Then, the CPU 2001 causes the gas dissolving unit 800 to operate, and drives the pump 701 under a first circulation condition to circulate the liquid W while monitoring the detection by the dissolution degree sensor (S03). In the present embodiment, the first circulation condition is a circulation condition suitable for dissolving the gas G into the liquid W. In the present embodiment, this first circulation condition is set such that the flow rate and flow pressure of the liquid in the circulation route are 500 to 3000 mL/min and 0.2 to 0.6 MPa, respectively. Specifically, in S03, the CPU 2001 causes the pump control unit 2004 to drive the pump 701 so as to maintain such a flow rate and flow pressure.

In a case where, for example, the UFB generating unit has a configuration based on the Venturi method, i.e., a liquid is passed through a particular flow passage structure to generate UFBs, the generation of UFBs cannot be stopped without stopping the liquid flow, and bubbles of unintended sizes may be generated. In the present embodiment, however, the T-UFB method is employed. Thus, UFBs are not generated at the UFB generating unit 1000 without a voltage applied to its heating elements (heaters). Thus, by causing the UFB generating unit 1000 not to operate in S03, UFBs are not generated, and in this state the circulated liquid W can efficiently raise only the degree of dissolution of the gas G therein under the first circulation condition.

In a case where the dissolution degree sensor detects a predetermined degree of dissolution, the CPU 2001 causes the gas dissolving unit 800 and the pump 701 to stop operating (S04). As a result, the circulation of the liquid W stops. In this state, a liquid W in which the desired gas G is dissolved at a desired degree of dissolution is reserved in the first storing chamber 900.

Then, the CPU 2001 drives the pump 701 under a second circulation condition to circulate the liquid W (S05). In the present embodiment, the second circulation condition is a circulation condition suitable for the UFB generating unit 1000 to generate UFBs. In the present embodiment, this second circulation condition is set such that the flow rate and flow pressure of the liquid in the circulation route are 30 to 150 mL/min and 0.1 to 0.2 MPa, respectively. Specifically, in S05, the CPU 2001 causes the pump control unit 2004 to drive the pump 701 so as to maintain such a flow rate and flow pressure.

Further, the CPU 2001 causes the UFB generating unit 1000 to operate while monitoring the detection by the UFB concentration sensor. In doing so, the CPU 2001 causes the gas dissolving unit 800 not to operate. In other words, the UFB concentration in the circulated liquid W is efficiently raised under the second circulation condition.

In a case where the UFB concentration sensor detects a predetermined UFB concentration, the CPU 2001 causes the UFB generating unit 1000 and the pump 701 to stop operating (S06). As a result, the circulation of the liquid W stops. In this state, a UFB-containing liquid W containing UFBs of the desired gas G at a desired concentration is reserved in the first storing chamber 900.

Then, the CPU 2001 opens the valve 904 to discharge the UFB-containing liquid W stored in the first storing chamber 900 to a collection container on the outside (S07). In doing so, the CPU 2001 may discharge the entirety of the liquid W stored in the first storing chamber 900 or discharge only part of the liquid W.

Then, the CPU 2001 determines whether the liquid W collected in the collection container has reached a target amount (S08). If the target amount has been reached, the CPU 2001 returns to S01 and repeats steps S01 to S07. On the other hand, if it is determined in S08 that the target amount has not been reached, this process is terminated.

As described above, according to the present embodiment, UFBs are generated in the UFB generating unit 1000 by using a liquid in which a substance to be cores for the UFB generation are dissolved or dispersed. In this way, a high-concentration UFB-containing liquid can be produced.

Moreover, in the UFB-containing liquid being ozone water produced in the above manner, the ozone can last for a long time. In other words, a UFB-containing liquid with a longer ozone life can be provided.

Second Embodiment

Figure 22:
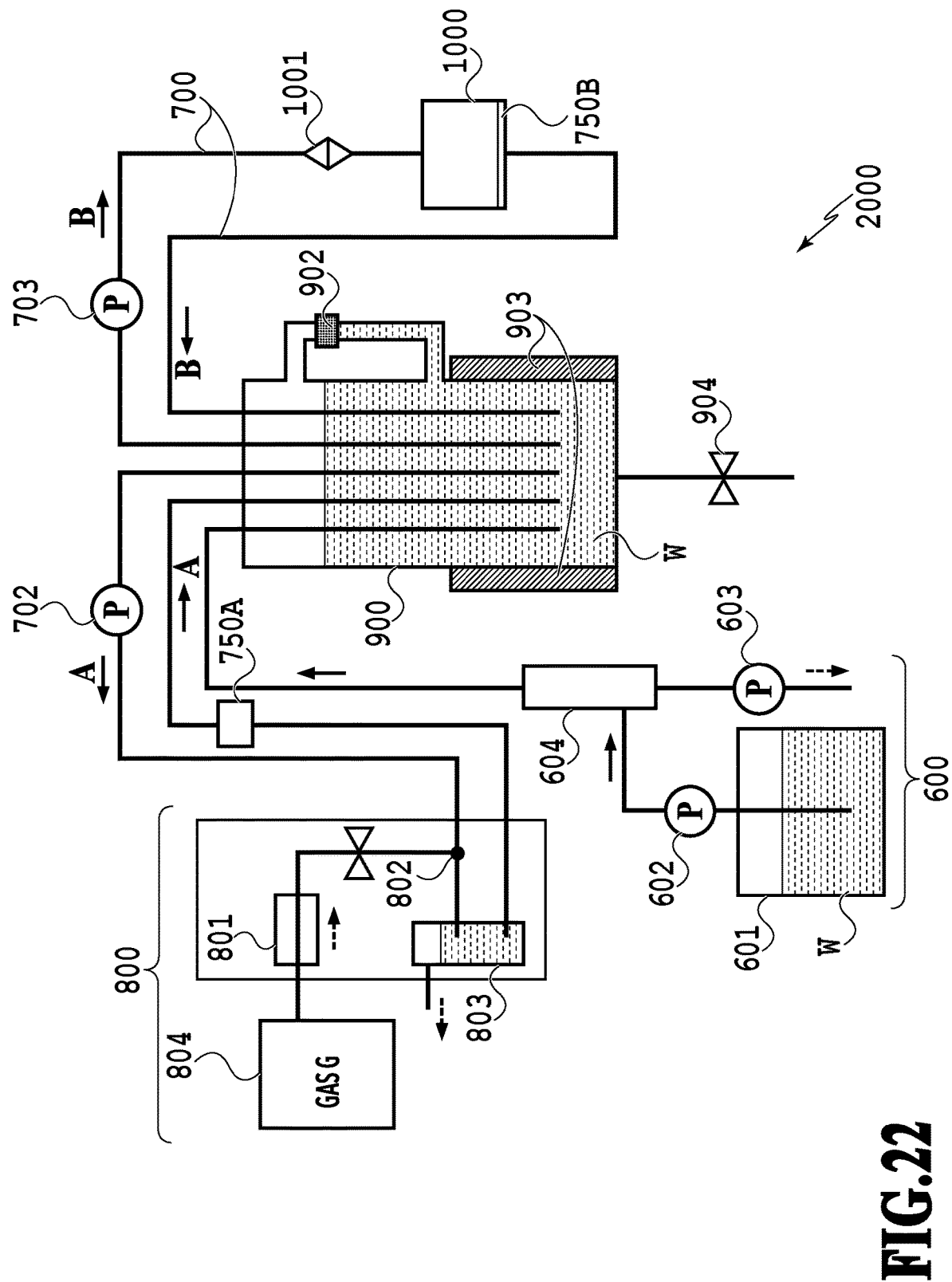
FIG. 22 is a schematic configuration diagram of a UFB-containing liquid producing apparatus.

FIG. 22 is a schematic configuration diagram of a UFB-containing liquid producing apparatus 2000 in a second embodiment. The UFB-containing liquid producing apparatus 2000 in the present embodiment differs from that in the first embodiment illustrated in FIG. 13 in that two circulation routes are prepared for the first storing chamber 900. A circulation route A indicated by arrow A in FIG. 22 is a circulation route starting from the first storing chamber 900, passing through the gas dissolving unit 800, and returning to the first storing chamber 900, and uses the first pump 702 as a driving source. A circulation route B indicated by arrow B is a circulation route starting from the first storing chamber 900, passing through the UFB generating unit 1000, and returning to the first storing chamber 900, and uses a second pump 703 as a driving source.

By preparing two circulation routes as above, the UFB-containing liquid producing apparatus 2000 in the present embodiment can execute a step of dissolving the desired gas G and a step of generating UFBs in independent circulation routes in which circulation conditions suitable for the respective steps are set.

Note that FIG. 22 illustrates an example in which the first core supplying unit 750A is disposed in the circulation route A, but the first core supplying unit 750A may be disposed in the circulation route B or disposed in the circulation routes A and B. The first core supplying unit 750A can be one of the first core supplying units 750A described in FIGS. 17 to 20. The second core supplying unit 750B is also disposed in the UFB generating unit 1000.

Next, an example of the UFB-containing liquid producing method will be described. In the present embodiment, as described in the first embodiment, the CPU 2001 reserves a predetermined amount of a liquid in the first storing chamber 900 and adjusts its temperature. Then, the CPU 2001 causes the gas dissolving unit 800 to operate, and drives the first pump 702 under a first circulation condition to start circulating a liquid W through the circulation route A. The content of the first circulation condition is similar to that in the first embodiment. Then, this circulation through the circulation route A is continued until the dissolution degree sensor detects a predetermined degree of dissolution. In a case where the dissolution degree sensor detects the predetermined degree of dissolution, the CPU 2001 causes the gas dissolving unit 800 and the first pump 702 to stop operating.

Then, in a case where the dissolution degree sensor detects the predetermined degree of dissolution, the CPU 2001 starts the circulation through the circulation route B. Specifically, the CPU 2001 drives the second pump 703 under the second circulation condition and also causes the UFB generating unit 1000 to operate. The content of the second circulation condition is also similar to that in the first embodiment. Then, this circulation through the circulation route B is continued until the UFB concentration sensor detects a predetermined UFB concentration. In a case where the UFB concentration sensor detects the predetermined UFB concentration, the CPU 2001 causes the UFB generating unit 1000 and the second pump 703 to stop operating.

After the circulation through the circulation route A and the circulation through the circulation route B are both stopped, the CPU 2001 opens the valve 904 to discharge the liquid W stored in the first storing chamber 900 to the collection container on the outside. The subsequent step is the same as that in the example described in the first embodiment.

Incidentally, during the circulation through the circulation route B, the circulation through the circulation route A may be stopped, or circulation under a third circulation condition may be performed. The third circulation condition is a condition for recovering the degree of dissolution of the gas in the liquid that has decreased as a result of generating UFBs. While the third circulation condition may be the same condition as the first circulation condition, a flow rate and pressure lower than those in the first circulation condition may be used in order to prevent the generated UFBs from being broken. Alternatively, the third circulation condition may be such that the flow rate and pressure are the same as those in the first circulation condition but the circulation under the first circulation condition is performed and stopped repetitively and periodically. Either way, according to this example, the degree of dissolution of the gas in the liquid W can be maintained at a preferred value regardless of the concentration of contained UFBs. This can further improve the UFB generation efficiency.

According to the present embodiment, the circulation route A and the circulation route B are both shorter than the circulation route illustrated in the first embodiment. Thus, the respective steps can be completed in a shorter time period than those in the first embodiment. In addition, the step of dissolving the gas G in the circulation route A and the step of generating UFBs in the circulation route B can be performed in individual routes under circulation conditions suitable for the individual steps. Accordingly, a desired UFB-containing liquid can be produced more efficiently.

Furthermore, according to the present embodiment, the route through which the liquid flows at a higher flow rate and pressure (circulation route A) is shorter than that in the first embodiment. Thus, the UFB-containing liquid producing apparatus itself can be made less costly and smaller in size and its maintenance is also expected to be easier.

Third Embodiment

Figure 23:
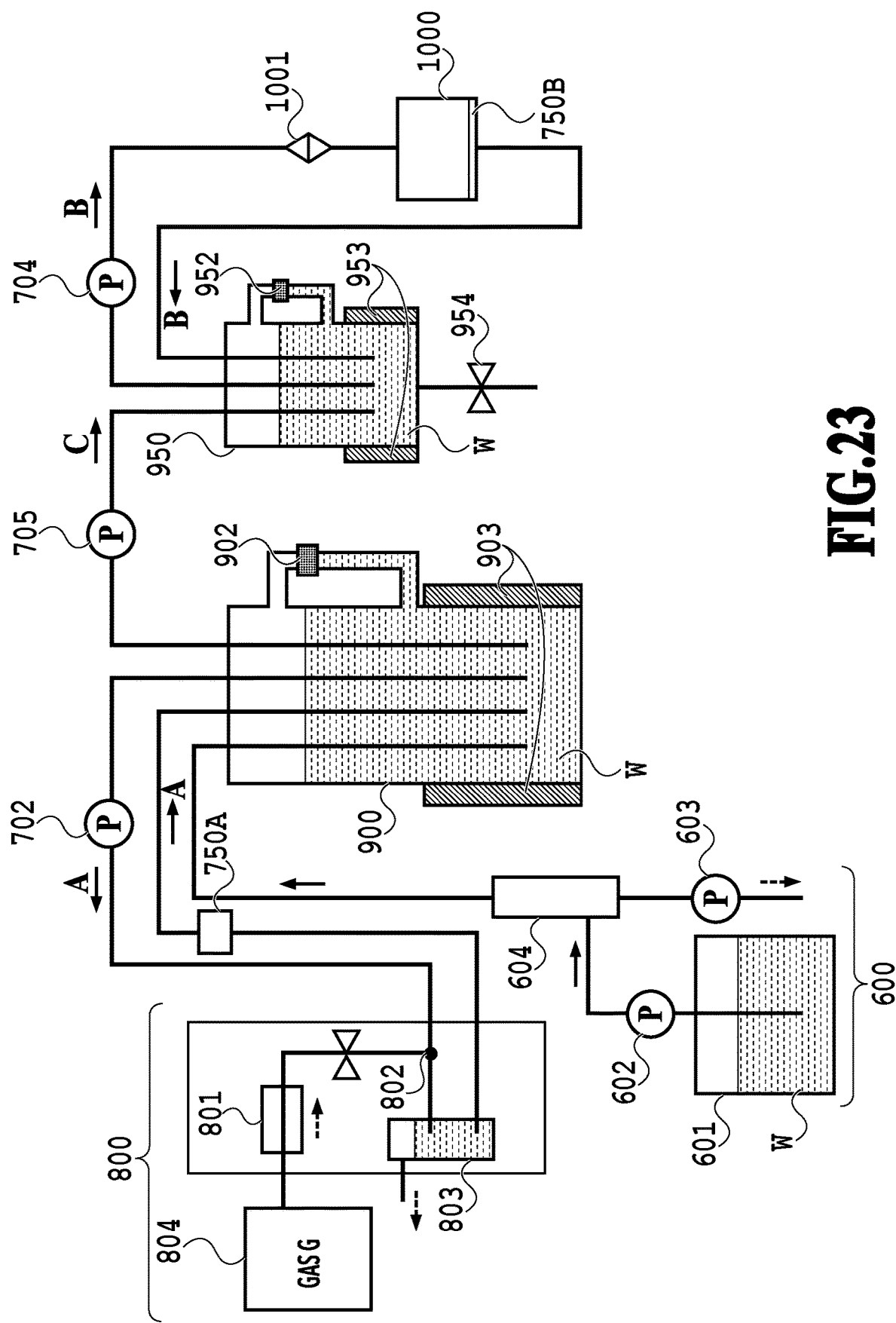
FIG. 23 is a schematic configuration diagram of a UFB-containing liquid producing apparatus.

FIG. 23 is a schematic configuration diagram of a UFB-containing liquid producing apparatus 2000 in a third embodiment. The UFB-containing liquid producing apparatus 2000 in the present embodiment differs from that in the second embodiment illustrated in FIG. 22 in that a second storing chamber 950 is added.

The second storing chamber 950 is smaller than the first storing chamber 900 and has a capacity of about 1/100 to 1/5 of the first storing chamber 900. Like the first storing chamber 900, the second storing chamber 950 is preferably made of a material with high corrosion resistance as well. For example, a fluorine-based resin such as PTFE or PFA, a metal such as SUS316L, or another inorganic material can be preferably used. The second storing chamber 950 has substantially the same configuration as that of the first storing chamber 900, and includes a liquid level sensor 952 and a cooling unit 953. In the present embodiment, however, only the second storing chamber 950, not the first storing chamber 900, is provided with a UFB concentration sensor for detecting the concentration of contained UFBs and a pipe and a valve 954 for discharging a UFB-containing liquid to a container on the outside.

A circulation route A indicated by arrow A in FIG. 23 is a circulation route starting from the first storing chamber 900, passing through the gas dissolving unit 800, and returning to the first storing chamber 900, and uses the first pump 702 as a driving source. A circulation route B indicated by arrow B in FIG. 23 is a circulation route starting from the second storing chamber 950, passing through the UFB generating unit 1000, and returning to the second storing chamber 950, and uses a third pump 704 as a driving source. Further, the route indicated by arrow C in FIG. 23 is a route for transferring a liquid W from the first storing chamber 900 to the second storing chamber 950, and uses a fourth pump 705 as a driving source.

Note that FIG. 23 illustrates an example in which the first core supplying unit 750A is disposed in the circulation route A, but the first core supplying unit 750A may be disposed in the circulation route B or disposed in the circulation route C. Alternatively, the first core supplying unit 750A may be disposed in two or more of the circulation routes A, B, and C. The first core supplying unit 750A can be one of the first core supplying units 750A described in FIGS. 17 to 20. The second core supplying unit 750B is also disposed in the UFB generating unit 1000.

In this UFB-containing liquid producing apparatus 2000 in the present embodiment, the circulation route A for dissolving the desired gas G and the circulation route B for generating UFBs do not merge with each other and are independent of each other. Thus, even in a case where liquids are caused to flow through these two circulation routes simultaneously, the circulation conditions, such as flow rate and pressure, in the circulation routes do not affect each other, and a condition suitable for each circulation route can be maintained with high accuracy. For example, the flow rate and pressure in the first circulation condition may be higher than the flow rates and pressures in the first and second embodiments in order to further raise the efficiency of dissolution of the gas into the liquid W. Also, the circulation condition may include the temperature of the liquid in each circulation route in addition to the flow rate and pressure, and the adjusted temperature may be set differently for the circulation route A and the circulation route B. Specifically, a temperature suitable for dissolving the desired gas G may be set in a first circulation condition, and a temperature suitable for generating UFBs may be set in a second circulation condition.

Next, an example of the UFB-containing liquid producing method will be described. In the present embodiment, as described in the first embodiment, the CPU 2001 reserves a predetermined amount of a liquid in the first storing chamber 900 and adjusts its temperature. Then, the CPU 2001 causes the gas dissolving unit 800 to operate, and drives the first pump 702 under the first circulation condition to start circulation through the circulation route A. In doing so, the CPU 2001 causes the third pump 704 and the fourth pump 705 not to operate. The content of the first circulation condition may be the same as that in the first embodiment or be a higher flow rate and pressure than those in the first embodiment. Then, this circulation through the circulation route A is continued until the dissolution degree sensor detects a predetermined degree of dissolution.

In a case where the dissolution degree sensor detects the predetermined degree of dissolution, the CPU 2001 transfers part of the liquid W stored in the first storing chamber 900 to the second storing chamber 950. Specifically, the CPU 2001 firstly causes the gas dissolving unit 800 and the first pump 702 to stop operating. Then, the CPU 2001 causes the fourth pump 705 to operate while monitoring the detection by the liquid level sensor 952 provided in the second storing chamber 950, and stops the fourth pump 705 when the liquid level sensor 952 detects a liquid surface. As a result, a predetermined amount of a liquid W is reserved in the second storing chamber 950.

Then, the CPU 2001 supplies the amount of a liquid W transferred to the second storing chamber 950 from the liquid supplying unit 600 to the first storing chamber 900 again. Specifically, the CPU 2001 causes the pumps 602 and 603 to operate until the liquid level sensor 902 detects a liquid surface.

After the temperature detected by the temperature sensor (not shown) reaches 10° C. or lower, the CPU 2001 causes the gas dissolving unit 800 to resume operating, and drives the first pump 702 under a third circulation condition to circulate a liquid W through the circulation route A. The third circulation condition may be the same flow and pressure as those in the first circulation condition or be a different flow rate and pressure from those in the first circulation condition. Alternatively, the third circulation condition may be such that the flow rate and pressure are the same as those in the first circulation condition but the circulation under the first circulation condition is performed and stopped repetitively and intermittently.

In a case where the dissolution degree sensor detects a predetermined degree of dissolution, the CPU 2001 causes the gas dissolving unit 800 and the first pump 702 to stop operating. Here, stopping the operation of the first pump 702 is not essential. That is, the subsequent step may be performed while continuing the circulation through the circulation route A.

The CPU 2001 also controls circulation through the circulation route B in parallel with the circulation through the circulation route A with the first pump 702. The CPU 2001 drives the third pump 704 under the second circulation condition to circulate the liquid W through the circulation route B, and causes the UFB generating unit 1000 to start operating. The content of the second circulation condition may be the same as that in the first embodiment or be a different condition from that in the first embodiment. Either way, it suffices that a flow rate and pressure suitable for UFB generation are set. The CPU 2001 continues such circulation through the circulation route B until the UFB concentration sensor provided in the second storing chamber 950 detects a predetermined UFB concentration.

In a case where the UFB concentration sensor detects the predetermined UFB concentration, the CPU 2001 causes the UFB generating unit 1000 and the third pump 704 to stop operating. The CPU 2001 then opens the valve 954 to discharge the liquid W stored in the second storing chamber 950 to the collection container on the outside.

Here, assume T1 as the time required to dissolve the desired gas G into a new liquid at a desired degree of dissolution after the first storing chamber 900 receives this liquid from the liquid supplying unit 600. Assume also that T2 is the time required to turn a liquid W supplied to the second storing chamber 950 into a UFB-containing liquid of a desired concentration and complete discharging it to the collection container. In the present embodiment, T1<T2 is satisfied. In the case where the above condition is satisfied, a liquid W in which the desired gas is dissolved at the desired dissolution concentration is already prepared in the first storing chamber 900 by the time the discharge from the second storing chamber 950 to the collection container is completed. Accordingly, the UFB generating step can be continued efficiently.

Then, the CPU 2001 determines whether the liquid W collected in the collection container has reached a target amount. If the target amount has not been reached, the CPU 2001 transfers a liquid from the first storing chamber 900 to the second storing chamber 950 again. In this case, the liquid reserved in the first storing chamber 900 is a liquid in which the desired gas has already been dissolved at the desired degree of dissolution. If, on the other hand, it is determined that the liquid W collected in the collection container has reached the target amount, this process is terminated.

According to the present embodiment described above, the step of dissolving the gas G in the circulation route A and the step of generating UFBs in the circulation route B can be performed simultaneously under respectively suitable circulation conditions. Further, since the circulation route A and the circulation route B do not merge with each other and are independent of each other, the conditions suitable for the respective circulation routes can be maintained with higher accuracy.

Fourth Embodiment

Figure 24:
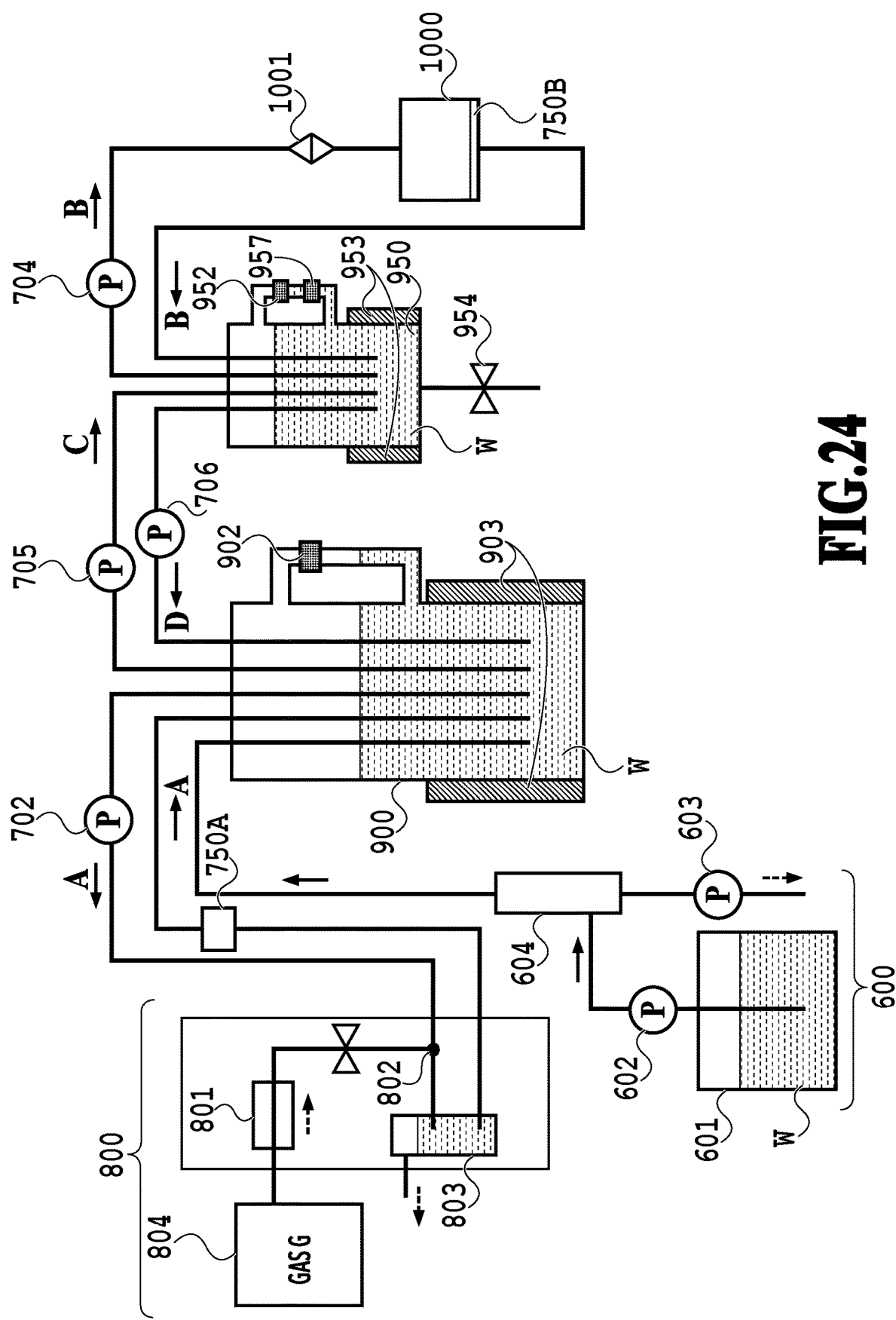
FIG. 24 is a schematic configuration diagram of a UFB-containing liquid producing apparatus.

FIG. 24 is a schematic configuration diagram of a UFB-containing liquid producing apparatus 2000 in a fourth embodiment. The UFB-containing liquid producing apparatus 2000 in the present embodiment differs from that in the third embodiment illustrated in FIG. 23 in that the route indicated by arrow D in FIG. 24 is added. The route indicated by arrow D in FIG. 24 is a route for transferring a liquid W from the second storing chamber 950 to the first storing chamber 900, and uses a fifth pump 706 as a driving source. Also, the second storing chamber 950 in the present embodiment is provided with a lower-limit sensor 957 for managing the lower limit of the liquid level, in addition to the liquid level sensor 952 for managing the upper limit of the liquid level. The fourth pump 705 for transferring a liquid W from the first storing chamber 900 to the second storing chamber 950 and the fifth pump 706 for transferring a liquid W from the second storing chamber 950 to the first storing chamber 900 may be identical pumps or pumps differing in liquid transfer performance.

Note that FIG. 24 illustrates an example in which the first core supplying unit 750A is disposed in the circulation route A, but the first core supplying unit 750A may be disposed in the circulation route B or disposed in the circulation route D. Alternatively, the first core supplying unit 750A may be disposed in two or more of the circulation routes A, B, C, and D. The first core supplying unit 750A can be one of the first core supplying units 750A described in FIGS. 17 to 20. The second core supplying unit 750B is also disposed in the UFB generating unit 1000.

According to the present embodiment having the above configuration, the liquid W in the UFB generating step in the circulation route B can be returned to the gas dissolving step in the circulation route A again. That is, the degree of dissolution of the gas that has decreased as a result of generating UFBs can be adjusted to the proper degree of dissolution again by bringing the liquid back into the circulation route A.

Next, an example of the UFB-containing liquid producing method will be described. In the present embodiment, as described in the first embodiment, the CPU 2001 reserves a predetermined amount of a liquid in the first storing chamber 900 and adjusts its temperature. In a case where the dissolution degree sensor detects a predetermined degree of dissolution, the CPU 2001 transfers part of the liquid W stored in the first storing chamber 900 to the second storing chamber 950. Here, the CPU 2001 does not stop the first pump 702 and maintains the circulation through the circulation route A.

Then, the CPU 2001 drives the third pump 704 under the second circulation condition to circulate the liquid W through the circulation route B, and causes the UFB generating unit 1000 to start operating. Then, the CPU 2001 determines whether the UFB concentration sensor has detected a predetermined UFB concentration. If determining that the predetermined UFB concentration has not been reached, the CPU 2001 returns part of the liquid W stored in the second storing chamber 950 back into the first storing chamber 900. Specifically, the CPU 2001 causes the fifth pump 706 to operate while monitoring the detection by the lower-limit sensor 957 provided in the second storing chamber 950, and causes the fifth pump 706 to stop operating when the lower-limit sensor 957 detects a liquid surface. As a result, a predetermined amount of the liquid W is returned to the first storing chamber 900 from the second storing chamber 950.

In a case where the dissolution degree sensor detects the predetermined degree of dissolution, the CPU 2001 transfers part of the liquid W stored in the first storing chamber 900 to the second storing chamber 950 again. Specifically, the CPU 2001 causes the fourth pump 705 to operate while monitoring the detection by the liquid level sensor 952 provided in the second storing chamber 950, and causes the fourth pump 705 to stop operating when the liquid level sensor 952 detects a liquid surface. As a result, a predetermined amount of the liquid W is transferred to the second storing chamber 950 from the first storing chamber 900. Then, the steps of causing a liquid W to flow in and out between the first storing chamber 900 and the second storing chamber 950 in the above manner are repeated until the UFB concentration sensor detects the predetermined UFB concentration.

If determining that the UFB concentration sensor has detected the predetermined UFB concentration, the CPU 2001 stops the UFB generating unit 1000 and the circulation through the circulation route B. The CPU 2001 then opens the valve 954 to discharge the liquid W stored in the second storing chamber 950 to the collection container on the outside.

Then, the CPU 2001 determines whether the liquid W collected in the collection container has reached a target amount. If the target amount has been reached, the CPU 2001 repeats the process from the step of reserving the predetermined amount of a liquid in the first storing chamber 900. If determining that the target amount has been reached, the CPU 2001 stops the circulation through the circulation route A and the operation of the gas dissolving unit 800. This process is then terminated.

According to the present embodiment described above, the gas dissolving step in the circulation route A and the UFB generating step in the circulation route B can be performed in a continuous manner, even during movement of a liquid W between the first storing chamber 900 and the second storing chamber 950 and discharge of a liquid from the second storing chamber 950. The UFB-containing liquid production efficiency can therefore be improved to a greater extent than the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-032756, filed Feb. 28, 2020 and No. 2021-018346, filed Feb. 8, 2021, which are hereby incorporated by reference wherein in their entirety.

What is claimed is:

1. A method of producing an ultrafine bubble-containing liquid containing ultrafine bubbles generated by causing film boiling in a liquid with a heat generation member, comprising:

detaching a solid present on the heat generation member in a form of a microscopic substance by using the film boiling; and generating ultrafine bubbles with the detached microscopic substance as a core, wherein the microscopic substance contains a component of a kogation formed on a liquid contact surface of a layer that protects the heat generation member and produced as a result of heating the liquid.

2. The method according to claim 1, wherein the core contains a component of a liquid contact surface of a channel wall of a channel through which the liquid passes.

3. The method according to claim 1, wherein the core contains a component contained in the liquid.

4. The method according to claim 1, wherein the detachment of the microscopic substance is caused by using at least one of heat and pressure resulting from the film boiling.

5. The method according to claim 4, wherein the heat or the pressure resulting from the film boiling is generated by at least one of appearance, growth, shrinkage, and disappearance of the film boiling.

6. The method according to claim 1, wherein the detachment of the microscopic substance is caused by a chemical, electrical, or mechanical effect based on at least one of heat and pressure resulting from the film boiling.

7. The method according to claim 1, wherein the microscopic substance has a particle size of 100 nm or less.

8. The method according to claim 1, wherein the microscopic substance has a solubility parameter (SP) value different from that of the liquid.

9. A method of producing an ultrafine bubble-containing liquid containing ultrafine bubbles generated by causing film boiling in a liquid with a heat generation member, comprising:

detaching a solid present at a liquid contact surface of the heat generation member in a form of a microscopic substance by using the film boiling; and generating ultrafine bubbles with the detached microscopic substance as a core, wherein the microscopic substance is a compound containing Si.

10. The method according to claim 9, wherein the compound containing Si is SiN, SiO, SiC, SiON, or SiOC.

11. A method of producing an ultrafine bubble-containing liquid containing ultrafine bubbles generated by causing film boiling in a liquid with a heat generation member, comprising:

detaching a solid present at a liquid contact surface of the heat generation member in a form of a microscopic substance by using the film boiling; and generating ultrafine bubbles with the detached microscopic substance as a core, wherein the microscopic substance is a metal having a melting point of 1770° C. or higher.

12. The method according to claim 11, wherein the metal is a substance made of one selected from the group consisting of Hf, Ta, W, Nb, Ir, and Pt, or an alloy or oxide containing at least one selected from the group consisting of Hf, Ta, W, Nb, Ir, and Pt.

* * * * *